United States Patent
Lu et al.

(10) Patent No.: US 12,259,635 B2
(45) Date of Patent: Mar. 25, 2025

(54) SYSTEMS AND METHODS FOR HYBRID-MODE-FAMILY OPTICAL PARAMETRIC OSCILLATION FOR ROBUST COHERENT LIGHT GENERATION ON-CHIP

(71) Applicants: University of Maryland, College Park, College Park, MD (US); Government of the United States of America, as Represented by the Secretary of Commerce, Gaithersburg, MD (US)

(72) Inventors: Xiyuan Lu, Montgomery Village, MD (US); Kartik Srinivasan, Rockville, MD (US)

(73) Assignees: UNIVERSITY OF MARYLAND, COLLEGE PARK, College Park, MD (US); GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 123 days.

(21) Appl. No.: 17/959,538

(22) Filed: Oct. 4, 2022

(65) Prior Publication Data

US 2023/0107007 A1    Apr. 6, 2023

Related U.S. Application Data

(60) Provisional application No. 63/262,079, filed on Oct. 4, 2021, provisional application No. 63/375,489, filed on Sep. 13, 2022.

(51) Int. Cl.
*G02F 1/39* (2006.01)
*G02F 1/35* (2006.01)
(Continued)

(52) U.S. Cl.
CPC ............ *G02F 1/395* (2013.01); *G02F 1/3544* (2013.01); *G02F 1/392* (2021.01); *H01S 3/0627* (2013.01); *H01S 3/063* (2013.01); *H01S 3/1083* (2013.01)

(58) Field of Classification Search
CPC ........ G02F 1/3544; G02F 1/392; G02F 1/395; H01S 3/0627; H01S 3/063; H01S 1/1083
See application file for complete search history.

(56) References Cited

U.S. PATENT DOCUMENTS

| | | | |
|---|---|---|---|
| 11,754,908 B2 * | 9/2023 | Huang | G02F 1/353 385/32 |
| 2021/0080805 A1 * | 3/2021 | Srinivasan | G02F 1/3501 |

(Continued)

OTHER PUBLICATIONS

Lu et al., "On-chip optical parametric oscillation into the visible: generating red, orange, yellow, and green from a near-infrared pump," Oct. 12, 2020, Optica vol. 7, No. 10, pp. 1417-1425 (Year: 2020).*

(Continued)

*Primary Examiner* — Daniel Petkovsek
(74) *Attorney, Agent, or Firm* — George Likourezos; Carter, DeLuca & Farrell LLP

(57) ABSTRACT

A system for generating a coherent laser light includes a light source configured to pump a first color laser light and a device configured to generate a coherent second color light and a coherent third color light. The device includes a waveguide configured to couple to the light source and a microring resonator coupled to the light source via the waveguide. The microring resonator is configured to generate a coherent second color light and a coherent third color light. The generation of the coherent second color light and the coherent third color light is based on hybrid-mode optical parametric oscillation.

11 Claims, 18 Drawing Sheets

(51) Int. Cl.
  *H01S 3/06*   (2006.01)
  *H01S 3/063*  (2006.01)
  *H01S 3/108*  (2006.01)

(56) References Cited

U.S. PATENT DOCUMENTS

2022/0344907 A1* 10/2022 Shi .................. H04B 10/116
2022/0345220 A1* 10/2022 Shi .................. H01S 5/142

OTHER PUBLICATIONS

Lu, X. et al., "Milliwatt-threshold visible-telecom optical parametric oscillation using silicon nanophotonics", Optica, vol. 6, No. 12, pp. 1-7, Dec. 2019.
Lu, X. et al., "On-chip optical parametric oscillation into the visible: generating red, orange, yellow, and green from a hear-infrared pump", Optica, vol. 7, No. 10, pp. 1-9, Oct. 2020.
Domeneguetti, R. R. et al., "Parametric sideband generation in CMOS-compatible oscillators from visible to telecom wavelengths", Optica, vol. 8, No. 3, pp. 1-7, Mar. 2021.
Bruch, A. W. et al., "On-chip X(2) microring optical parametric oscillator", Optica, vol. 6, No. 10, pp. 1-6, Oct. 2019.
Lu, J. et al., "Ultralow-threshold thin-film lithium niobate optical parametric oscillator", Optica, vol. 8, No. 4, pp. 1-6, Apr. 2021.

* cited by examiner

SYSTEMS AND METHODS FOR HYBRID-MODE-FAMILY OPTICAL PARAMETRIC OSCILLATION FOR ROBUST COHERENT LIGHT GENERATION ON-CHIP

CROSS-REFERENCE TO RELATED APPLICATIONS AND CLAIM OF PRIORITY

This application claims the benefit of, and priority to, U.S. Provisional Patent Application No. 63/262,079, filed on Oct. 4, 2021, and U.S. Provisional Patent Application No. 63/375,489, filed on Sep. 13, 2022, the entire contents of each are hereby incorporated herein by reference.

GOVERNMENT SUPPORT

This invention was made with government support under HR0011-20-2-0046 awarded by the Defense Advanced Research Projects Agency, and 70NANB10H193, awarded by the National Institute of Standards and Technology (NIST). The government has certain rights in the invention.

TECHNICAL FIELD

The present disclosure relates generally to the field of on-chip optical parametric oscillation ("OPO"). More specifically, the present disclosure provides systems and methods for generating a coherent laser light.

BACKGROUND

Many applications in quantum information science, metrology, and sensing require access to coherent laser light at a variety of wavelengths, ideally in a chip-integrated format suitable for scalable fabrication and deployment. While integrated photonics lasers are highly developed in the telecommunications band, many of the aforementioned technologies operate at other wavelengths. To this end, the extension of heterogeneously integrated lasers to other bands has been pursued, with recent demonstrations at 980 nm and 2000 nm. However, wavelength access across the entirety of a broad spectral range would demand the challenging integration of several material platforms. In contrast, table-top nonlinear optics is widely used to produce coherent light at wavelengths that are difficult to access through direct laser emission.

Accordingly, there is interest in enabling flexible coherent light generation across a broad range of wavelengths.

SUMMARY

An aspect of the present disclosure provides a system for generating a coherent laser light. The device includes a light source which is configured to pump a first color laser light and a device which is configured to generate a coherent second color light. The device includes a waveguide configured to couple to the light source, and a microring resonator coupled to the light source via the waveguide. The microring resonator is configured to generate a coherent second color light and a coherent third color light. The generation of the coherent second color light and the coherent third color light are based on hybrid-mode optical parametric oscillation.

In accordance with aspects of the disclosure, the microring resonator may include a layer comprised of silicon nitride, the layer including a ring width, the layer including a first side and a second side, a substrate comprised of silicon dioxide disposed on the second side of the layer, and a cladding comprised of air disposed on the first side of the layer.

In an aspect of the present disclosure, the coherent second color light and the coherent third color light may be a different color than the first color laser light.

In another aspect of the present disclosure, the microring resonator may include a plurality of modes selected from different families of modes.

In yet another aspect of the present disclosure, the microring resonator and the waveguide are on a common substrate.

In accordance with further aspects of the present disclosure, the waveguide outputs a signal wave that may include a signal mode and an idler wave including an idler mode. The first color laser light includes a pump mode.

In an aspect of the present disclosure, the microring resonator may include a ring radius. The ring radius may be based on phase matching. The light source may include a pump mode. Phase-matching may be achieved by using a higher-effective-index for an idler mode, a higher-effective-index for the pump mode, and a higher-effective-index for the signal mode.

In another aspect of the present disclosure, the light source may include a pump mode. The pump mode is chosen from the higher-effective-index mode. The signal mode may be selected from the lower-effective-index mode. The matching of effective modal indices may be based on a difference of a higher-effective-index and the lower-effective-index at a wavelength of the signal wave.

In yet another aspect of the present disclosure, the substrate may include a first side and a second side. The microring resonator further includes a silicon layer disposed on the second side of the substrate.

In yet another aspect of the present disclosure, the substrate may include a first side and a second side. The device further includes a heater disposed on the second side of the heater.

An aspect of the present disclosure provides a microring resonator that may include a layer comprised of silicon nitride, the layer including a ring width, the layer may include a first side and a second side, a substrate comprised of silicon dioxide disposed on the second side of the layer, and a cladding comprised of air disposed on the first side of the layer.

In an aspect of the present disclosure, the microring resonator may be configured for coupling to a light source configured to generate a first color laser light. The microring resonator may be configured to generate a coherent second color light and a coherent third color light. The generation of the coherent second color light and the coherent third color light may be based on hybrid-mode optical parametric oscillation.

In another aspect of the present disclosure, the coherent second color light and the coherent third color light may be a different color than the first color laser light.

In yet another aspect of the present disclosure, the microring resonator may include a plurality of modes selected from different families of modes.

In yet another aspect of the present disclosure, the microring resonator may include a ring radius.

In accordance with further aspects of the present disclosure, the ring radius may be based on phase matching. Phase-matching may be achieved by selecting a higher-effective-index for an idler mode, a higher-effective-index for a pump mode, and a higher-effective-index for a signal mode.

In another aspect of the present disclosure, the pump mode may be chosen from the higher-effective-index mode. The signal mode may be selected from the lower-effective-index mode. The matching of effective modal indices may be based on a difference of a higher-effective-index and the lower-effective-index at a wavelength of the signal wave.

In yet another aspect of the present disclosure, the substrate may include a first side and a second side. The microring resonator may further include a heater disposed on the second side of the heater.

An aspect of the present disclosure provides a method for generating a coherent laser light. The method includes pumping a first color laser light by a light source, coupling a waveguide to the light source, coupling a microring resonator to the light source via the waveguide, and generating a coherent second color light and a coherent third color light by the microring resonator based on hybrid-mode optical parametric oscillation.

In a further aspect of the present disclosure, the method may further include selecting a pump mode of the light source from a higher-effective-index mode, selecting a signal mode from a lower-effective-index mode, and matching of effective modal indices based on a difference of the higher-effective-index and the lower-effective-index at a wavelength of a signal wave.

Further details and aspects of exemplary embodiments of the present disclosure are described in more detail below with reference to the appended figures.

BRIEF DESCRIPTION OF THE DRAWINGS

A better understanding of the features and advantages of the present disclosure will be obtained by reference to the following detailed description that sets forth illustrative embodiments, in which the principles of the present disclosure are utilized, and the accompanying drawings of which.

DETAILED DESCRIPTION

Figure 1:
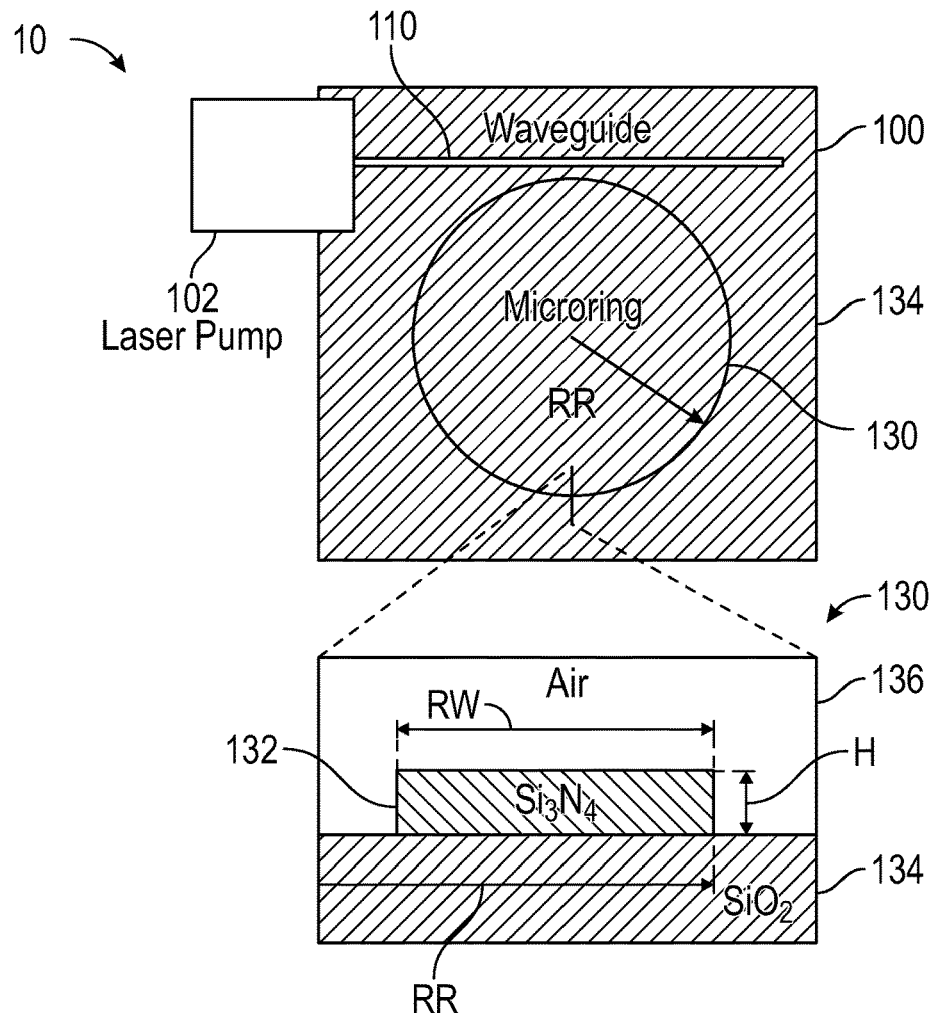
FIG. 1 is a diagram of an exemplary device for generating a coherent laser light, in accordance with examples of the present disclosure.

The present disclosure relates generally to the field of quantum operations. More specifically, the present disclosure provides systems and methods for generating a coherent laser light.

Embodiments of the present disclosure are described in detail with reference to the drawings wherein like reference numerals identify similar or identical elements.

Although the present disclosure will be described in terms of specific examples, it will be readily apparent to those skilled in this art that various modifications, rearrangements, and substitutions may be made without departing from the spirit of the present disclosure. The scope of the present disclosure is defined by the claims appended hereto.

For purposes of promoting an understanding of the principles of the present disclosure, reference will now be made to exemplary embodiments illustrated in the drawings, and specific language will be used to describe the same. It will nevertheless be understood that no limitation of the scope of the present disclosure is thereby intended. Any alterations and further modifications of the novel features illustrated herein, and any additional applications of the principles of the present disclosure as illustrated herein, which would occur to one skilled in the relevant art and having possession of this disclosure, are to be considered within the scope of the present disclosure.

Optical parametric oscillation (OPO) is distinguished by its wavelength access, that is, the ability to flexibly generate coherent light at wavelengths that are dramatically different from the pump laser (e.g., input laser) and, in principle, bounded solely by energy conservation between the input pump field and the output signal (e.g., idler) fields. As integrated photonics advances toward many applications in quantum information science, metrology, and sensing, microchip OPO devices can provide a path for accessing relevant wavelengths using lasers. OPOs based on the third-order ($\chi^{(3)}$) optical non-linearity are of particular interest, as $\chi^{(3)}$ is naturally available in silicon photonics. Apart from wavelength access, conversion efficiency and output power are critical to real-world applications, and to date, no $\chi^{(3)}$ OPO device has been able to simultaneously realize high performance with respect to all three metrics of wavelength access, conversion efficiency, and output power. The disclosed technology demonstrates a microresonator photonics OPO device with unprecedented performance, approaching that of fiber-based and tabletop technologies. The disclosed microresonator OPO device produces output signal and idler fields widely separated in frequency from each other (>150 THz) and from the pump and exhibits a pump-to-idler conversion efficiency up to 29% with a corresponding output idler power of >18 mW on-chip. Underpinning this performance is the suppression of competitive nonlinear processes that would otherwise saturate parametric gain and the strong overcoupling of the output light while maintaining a high overall cavity quality factor. The disclosed technology may be readily applied to existing silicon photonics platforms with heterogeneously integrated pump lasers, enabling flexible coherent light generation across a broad range of wavelengths.

Figure 2:
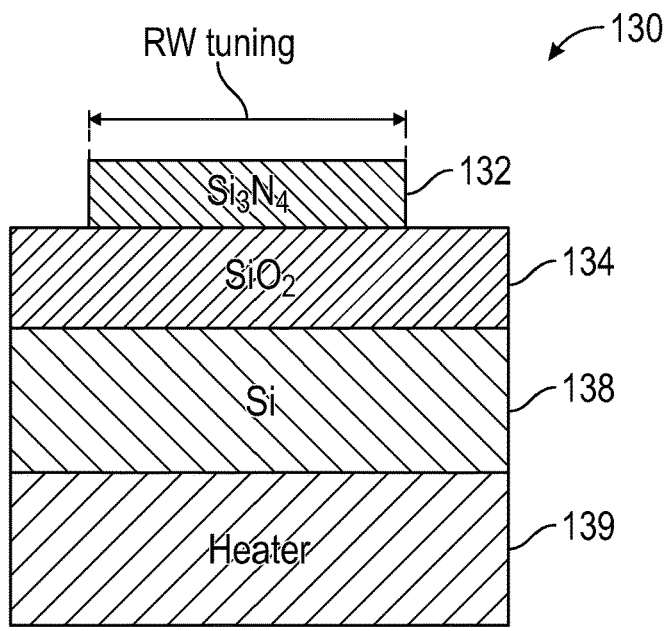
FIG. 2 is a side cutaway view of a microring resonator of the device of FIG. 1, in accordance with examples of the present disclosure.

Referring to FIGS. 1 and 2, a diagram of an example system 10 and device 100 for generating a coherent laser light using hybrid-mode optical parametric oscillation (hOPO), is shown. The device 100 is configured for on-chip coherent light generation via the third order ($\chi^{(3)}$) non-linearity. The device 100 has the benefit of enabling broad spectral coverage with small device footprints at a low pump power.

The system 10 may include a light source 102 (e.g., pump) configured to pump a first color laser light and a device 100 configured to generate a coherent second color light (i.e., signal) and a coherent third color light (i.e., idler). The device 100 generally includes a waveguide 110, and a microring resonator 130 (e.g., a microresonator) configured to generate a coherent second color light and the coherent second color light in response to the first color laser light. The coherent second color light is a different color than the first color laser light. The coherent third color light is a different color than the first color laser light. The coherent second color light is a different color than the third color laser light. The waveguide 110 is configured to couple the light source 102 to the microring resonator 130. The waveguide 110 may be comprised of, for example, silicon nitride and/or silicon oxynitride, or other such suitable materials.

The term hybrid-mode-family as used herein includes different mode families. The demonstrated hOPO devices have a threshold power of about 10 mW and show unprecedented robustness against geometric variation (up to 500 nm change in ring width), pump frequency tuning (about 1:1 ratio of the output signal, and idler tuning to the input pump tuning), and temperature tuning (across a temperature range of 40° C.). By operating in a regime in which the pump band is in a regime of large normal dispersion, hOPO is particularly promising for realizing high conversion efficiency from pump to signal, as most competing four-wave mixing mediated processes are suppressed. In aspects, an hOPO on-chip conversion efficiency of about eight percent, and with signal power as high as about five mW may be achieved.

The microring resonator 130 generally includes a layer 132 comprised of silicon nitride ($Si_3N_4$) and a substrate 134 comprised of silicon dioxide ($SiO_2$). It is contemplated that other suitable materials may be used for the substrate 134 and for the layer 132. For example, the layer 132 material may include sapphire, quartz, $MgF_2$ or any material with a similar refractive index. The layer 132 includes a ring width (RW) which can be configured for tuning the microring resonator 130, a ring radius (RR), and a height (H). The microring resonator 130 may include a cladding 136 comprised of air. The cladding 136 may be disposed on a first side of the layer 132. The microring resonator 130 includes a plurality of modes selected from different families of modes. The modes are typically either transverse-electric-like (TE) or transverse-magnetic-like (TM). For hOPO, the phase and frequency match the azimuthal modes of the microring resonator 130 to different transverse spatial mode families of the microring resonator 130. In aspects, the microring resonator 130 may further include a layer of silicon (Si) disposed on a second side of the substrate 134. The microring resonator 130 may further include a heater 139 configured for thermal management of the microring resonator 130.

Figure 6:
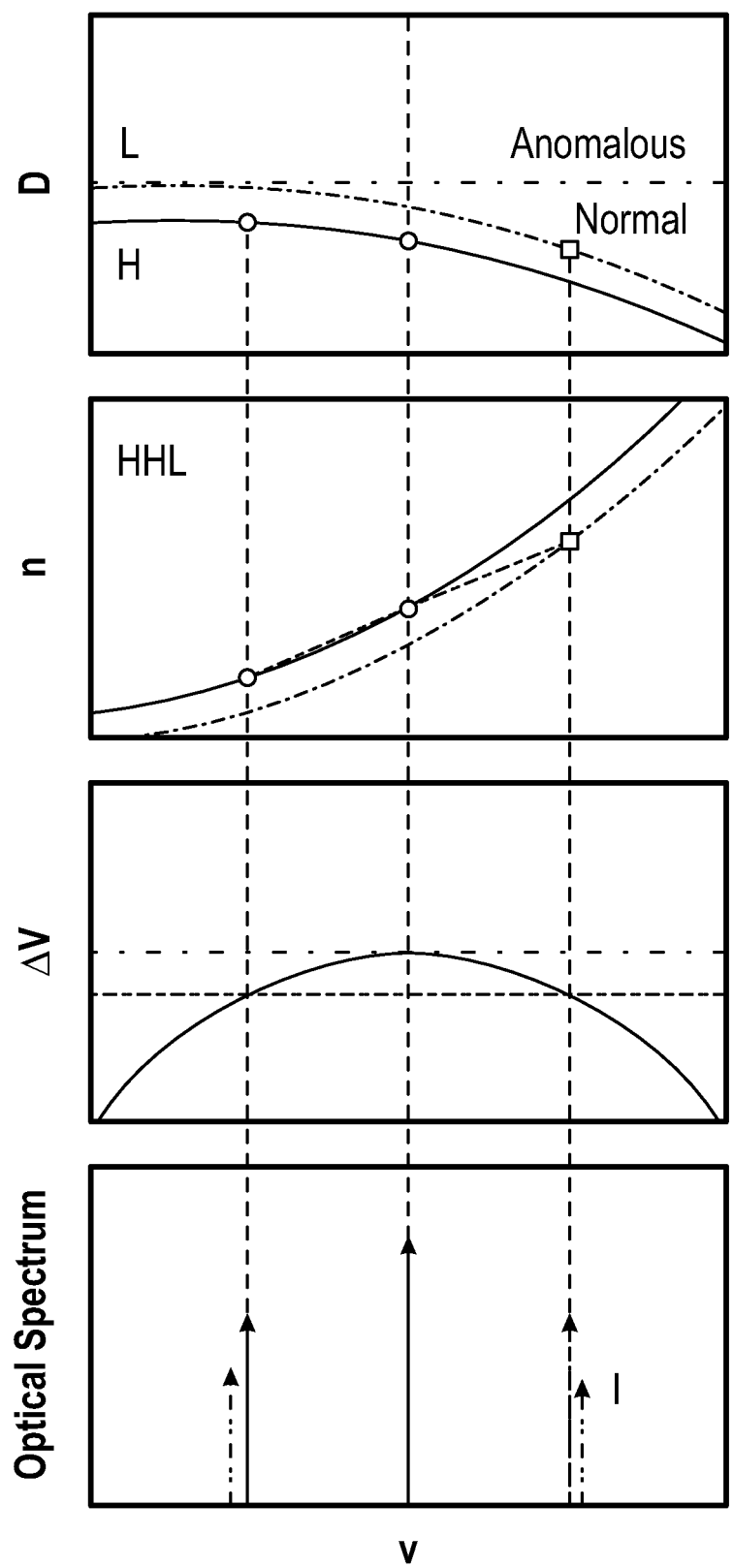
FIG. 6 is a graph illustrating hybrid-mode-family optical parametric oscillation (h-OPO), in accordance with examples of the present disclosure.
Figure 8:
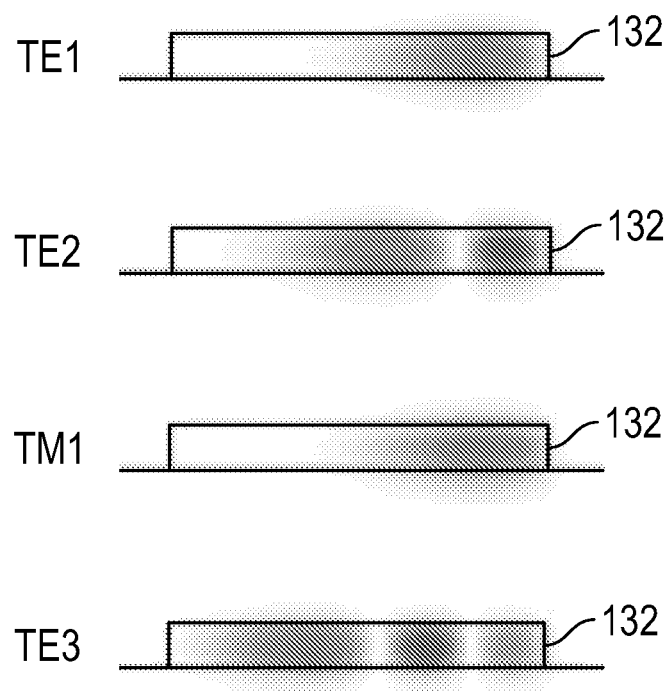
FIG. 8 is a diagram illustrating TE1, TE2, TM1, and TE3 operating modes of the device of FIG. 1, in accordance with examples of the present disclosure.

The device 100 uses ring widths, for example, with an aspect ratio of RW:H of about 8.7:1. The device 100 has its first four modes (sorted by decreasing effective modal index) as transverse electric 1 (TE1), transverse electric 2 (TE2), transverse magnetic 1 (TM1), and transverse electric 3 (TE3), as shown in FIG. 8. Lower-order modes have higher effective modal indices because of better confinement to the $Si_3N_4$ core. TM1 appears after TE2 because the microring aspect ratio of about 8.7:1 is much larger than the aspect ratios typically used in single-mode-family OPO or Kerr frequency comb generation in air-clad systems, which are usually between about 1.5:1 and about 3:1. The ring has a large normal dispersion (D) across the entire spectral range under consideration (top panel of FIG. 6). The compensation of the effective modal indices (i.e., phase-matching) is not achieved by a fine dispersion design as in the sOPO case, but rather by the difference of the effective modal indices of the two-mode families at either the idler or signal position. For example, the second panel of FIG. 6 illustrates a case in which phase-matching is achieved by using higher-index (H), higher-index (H), and lower-index (L) modes for idler, pump, and signal (frequencies ordered from low to high). In terms of frequency mismatch Δv, the matching of the effective modal indices (dashed line) is equivalent to matching a dashed line that is shifted in the normal dispersion regime (where Δv<0), with the shift related to the effective modal index difference of the signal mode in this case. As a result, this hOPO scheme will likely be free of many noise processes (e.g., those labeled as II and III as described earlier), and the main potential competitive process remaining is the adjacent signal and idler modes of the same configuration (i.e., HHL), illustrated by process I shown in the bottom panel of FIG. 6.

The device 100 utilizes high-performance $\chi^{(3)}$ OPO on a silicon microchip. By suppressing competing nonlinear processes that would otherwise saturate parametric gain and by strongly overcoupling the output mode while retaining high overall Q, a wide spectral separation between the participating modes (signal-idler separation of greater than about 150 THz), a high conversion efficiency (up to about 29%) is simultaneously realized, and useful output power (up to about 21 mW), a compelling combination of properties that have not previously been simultaneously achieved in on-chip OPO. The disclosed technology enables the use of OPO in silicon photonics to address many requirements for deployable laser technologies in scientific applications, particularly in light of recent progress on heterogeneous integration of III-V lasers and silicon nonlinear photonics.

Figure 4:
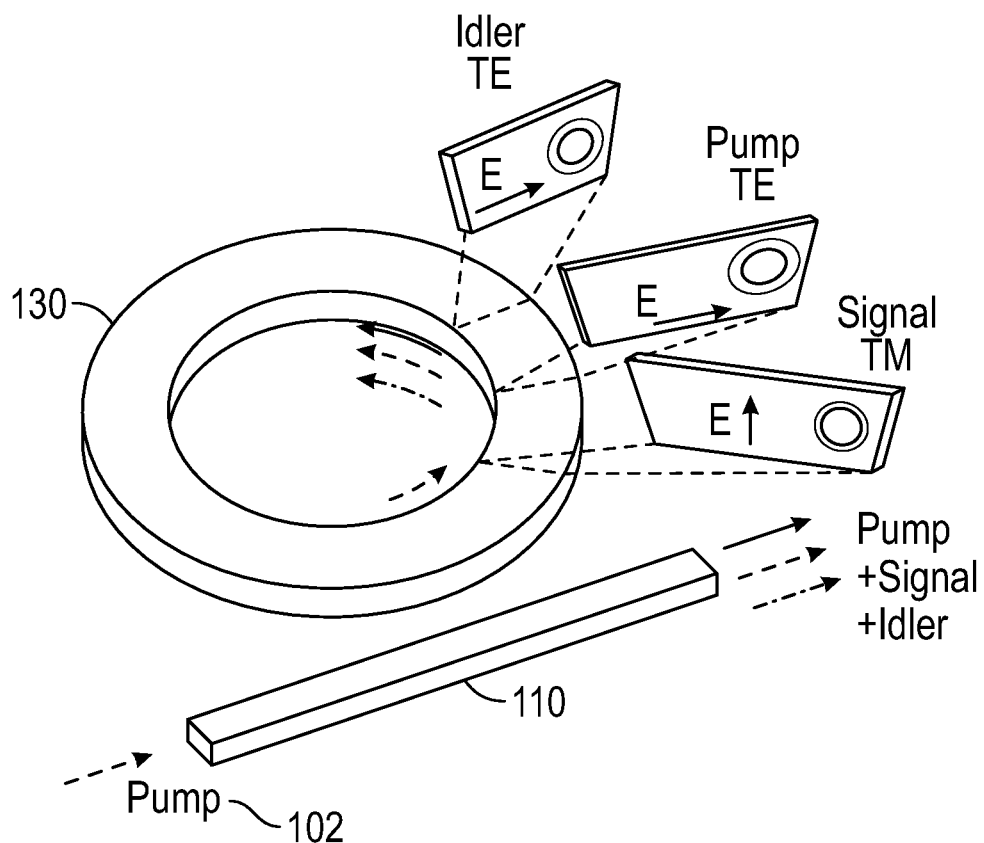
FIG. 4 is a top perspective view of the device of FIG. 1, in accordance with examples of the present disclosure.

In a $\chi^{(3)}$ OPO, pump photons at $v_p$ are converted to up-shifted signal photons ($v_s$, with $v_s > v_p$) and down-shifted idler photons ($v_i$, with $v_i < v_p$) that satisfy energy conservation ($2v_p = v_s + v_i$). Appreciable conversion efficiency requires phase-matching so that $2\beta_p = \beta_i + \beta_i$ where $\beta_{p,s,i}$ is the propagation constant for the pump, signal, and idler modes, respectively. In microring resonators, which have periodic boundary conditions, this phase relationship can be recast as $2m_p = m_s + m_i$ where $m_{p,s,i}$ denotes the azimuthal mode order of the pump, signal, and idler modes, respectively. Finally, OPO has a power threshold, meaning that the cavity modes must have sufficiently low loss rates (high loaded Q) that can be exceeded by the available parametric gain. While phase and frequency-matching and high-Q are baseline requirements for OPO, additional requirements are imposed if high-performance OPO is to be achieved. First, it is necessary to suppress competitive nonlinear processes that, for example, divert pump energy to the creation of frequency components other than the targeted signal and idler frequencies (FIG. 4). In addition, to maximize the conversion efficiency for the output field of interest, the pump injection into the microring and output extraction from the microring is optimized.

The conversion efficiency for the signal (or idler) is dependent on the coupling regime (e.g., overcoupled/undercoupled) of both the signal (or idler) and the pump. As a starting point, a simplified three-mode model in which only the pump, signal, and idler modes are allowed to interact, from which the system's maximum conversion efficiency, $\eta^{max}_{s,i} \equiv N_{s,i}/N_p$, can be derived is considered. Here, $N_p$ is the flux of pump photons at the input of the waveguide 110 and $N_{s,i}$ is flux of signal or idler photons at the output of the waveguide 110. The maximum conversion efficiency, $\eta^{max}_{s,i}$, will occur when the Kerr-shifted modes are perfectly phase-matched and frequency-matched and can be written in terms of the coupling parameter $K_{p,s,i}$ of each resonance as:

$$\eta^{max}_{s,i} = \frac{1}{2} \frac{K_p K_{s,i}}{(K_p + 1)(K_{s,i} + 1)}, \quad \text{(Eqn. 1)}$$

where $K_{p,s,i} = \kappa_{(p,s,i),ext}/\kappa_{(p,s,i),int}$ and $\kappa_{(p,s,i),(ext,int)}$ is the extrinsic (waveguide coupling) or intrinsic loss rate for the pump mode, signal mode, or idler mode. Eqn. 1 shows that $\eta^{max}_{s,i}$ in a $\chi^{(3)}$ OPO increases to a maximum value of 0.5 as $K_{p,s,i}$ increases without bound. However, strongly overcoupling the resonator decreases the total $Q \equiv v/(\kappa_{ext} + \kappa_{int})$ of the corresponding cavity mode(s), yielding a less efficient nonlinear enhancement. Strongly overcoupling the resonator may translate into very high threshold powers, which may be unsupportable by compact pump lasers. Therefore, efficient OPO generation via overcoupling uses a resonator with very high intrinsic $Q_{int}$ ab out $v/\kappa_{int}$ as a starting point. $Si_3N_4$ microring resonators, suitable for nonlinear photonics and created by mass-production fabrication techniques, can yield intrinsic $Q_{int} > 10^7$, suggesting that strong overcoupling can be reached while maintaining high overall Q.

In practice, the saturation of OPO usually occurs before $\eta^{max}_{s,i}$ is reached, especially when imposing the additional requirement of achieving $\eta^{max}_{s,i}$ with high output power. In OPO, the frequency mismatch $\Delta v = -2v_p + v_s + v_i$ between the cold-cavity resonances is compensated by their Kerr shifts, which are pump-power dependent quantities, so that there is a limited range of input powers for which $\Delta v$ will be small enough for high conversion efficiency to be achieved. Thermo-refractive shifts will typically also play a role, and in widely-separated OPO the wavelength-dependence of the thermo-refractive shifts also becomes meaningful. However, because dispersion is influenced by device 100 geometry, these effects can be addressed by choosing a geometry that targets $\Delta v > 0$ compatible with the input power range of interest.

A more significant challenge comes from parasitic nonlinear processes that deplete the gain of the desired OPO process. Competitive parasitic nonlinear processes in the device 100 are a consequence of a device's 100 many azimuthal spatial modes and can be worsened by the presence of higher-order transverse spatial modes (including those of a different polarization). As a result, in widely-separated OPO, there can be hundreds of modes that exist between the pump and targeted signal (or idler) mode, which can be populated by processes such as modulational instability and subsequent Kerr comb formation. These processes are detrimental to system efficiency as they divert pump photons away from the targeted three-mode OPO process. The natural way to limit close-to-pump parasitic nonlinear processes is to situate the pump in the normal dispersion regime so that Kerr shifts lead to a larger amount of frequency mismatch for nearby signal-idler pairs. However, normal dispersion around the pump (i.e., $\Delta v < 0$) must be balanced by sufficient higher-order dispersion for the widely-separated signal-idler pair of interest to be frequency matched so that $\Delta v$ is about 0. However, the amount of normal dispersion near the pump is also important, as cross-phase modulation involving the widely-separated signal and idler modes can result in nonlinear conversion to unwanted spectral channels near the pump if the amount of normal dispersion is insufficient. Thus, a dichotomy arises: strong normal dispersion suppresses parasitic processes, but strong normal dispersion makes the frequency matching and phase matching conditions challenging to satisfy.

This problem is circumvented through the use of hybrid-mode OPO (hOPO), in which phase and frequency matches azimuthal modes from different transverse spatial mode families. hOPO makes it possible for each of the pump, signal, and idler bands to have strong normal dispersion, thereby suppressing competitive processes while maintaining phase and frequency matching for the targeted modes. Hence, through careful design of the resonator's dispersion, it is possible to isolate the hOPO, taking the many-mode system to the limit where the system behaves like the modeled three-mode system, where high output power and high conversion efficiency are simultaneously accessible without sacrificing wavelength access.

Figure 3:
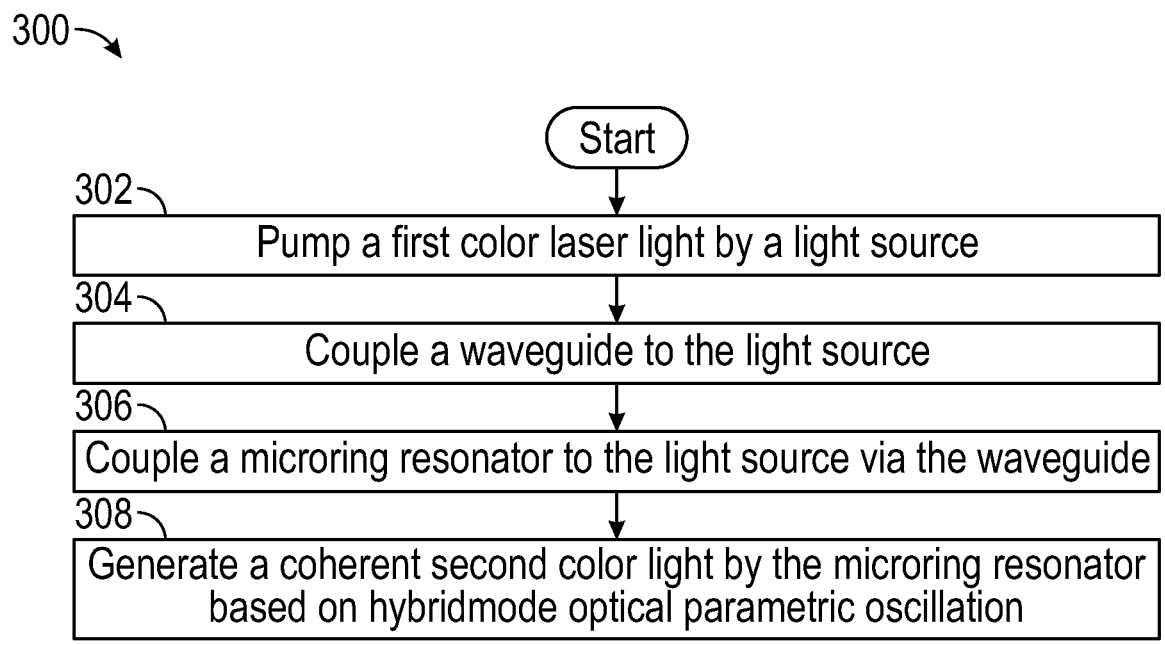
FIG. 3 is a method for generating a coherent laser light, in accordance with examples of the present disclosure.

Referring to FIG. 3, a flow diagram for operation 800 for generating a coherent laser light in accordance with aspects of the present disclosure is shown. Although the blocks of FIG. 8 are shown in a particular order, the blocks or steps need not all be performed in the illustrated order, and certain blocks can be performed in another order. The operation of FIG. 8 will be described below, and such operation may be performed by the device 100 of FIG. 1. These variations are contemplated to be within the scope of the present disclosure.

Initially, at block 302 a light source 102 of device 100 pumps a first color laser light. Next at block 304 the light source 102 is coupled to a waveguide 110 of device 100.

Next, at block 306 a microring resonator 130 of device 100 is coupled to the light source 102 via the waveguide 110. The microring resonator 130 includes a layer 132 comprised of silicon nitride, the layer 132 includes a first side and a second side; a substrate 134 comprised of silicon dioxide disposed on the second side of the layer 132; and a cladding 136 comprised of air disposed on the first side of the layer 132. The layer 132 includes a ring width (RW) and a height (H).

Next at block 308, the microring resonator 130 generates a coherent second color light and a coherent third color light based on hybrid-mode optical parametric oscillation. In aspects, the microring resonator 130 may be designed by selecting a pump mode of the light source from a higher-effective-index mode, selecting a signal mode from a lower-effective-index mode; and matching of effective modal indices based on a difference of the higher-effective-index and the lower-effective-index at a wavelength of a signal wave.

Figure 5:
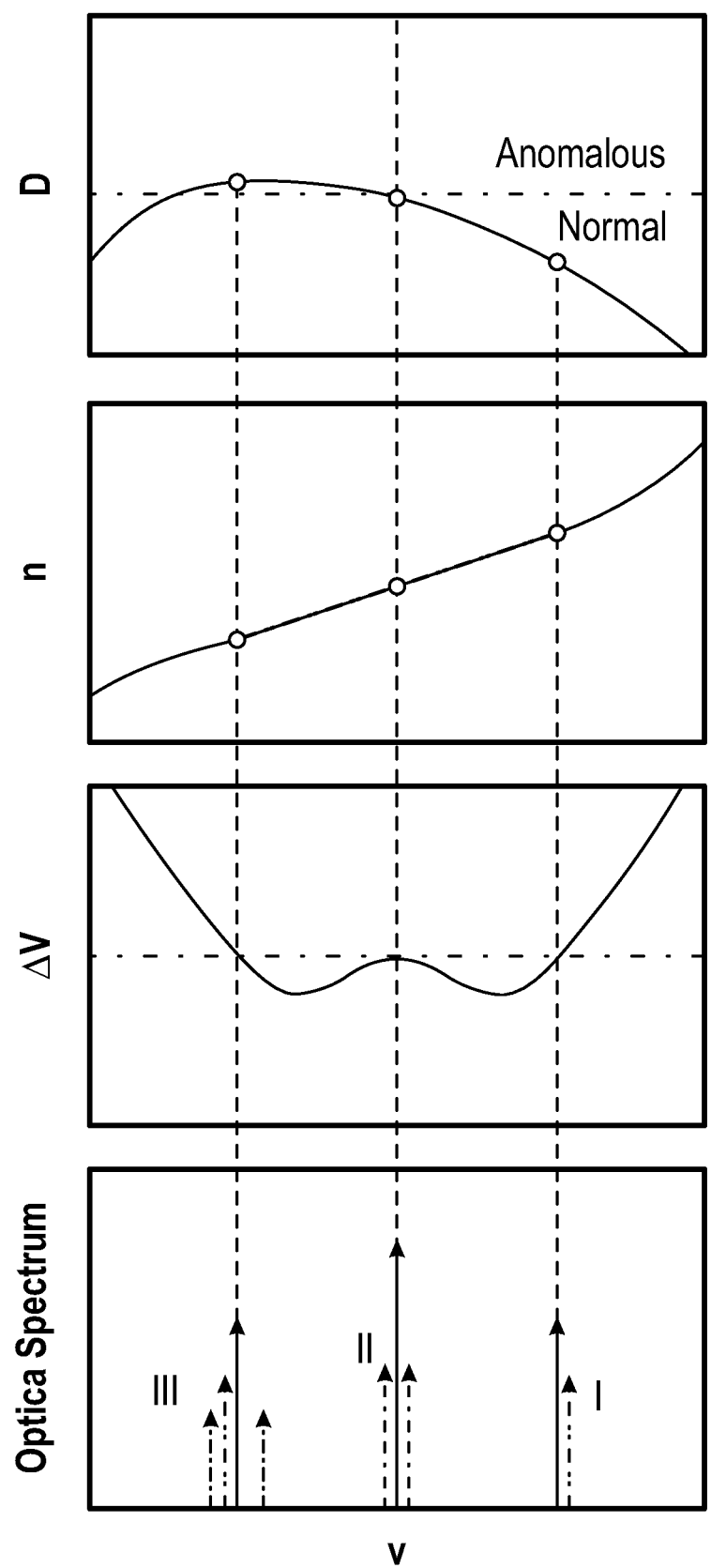
FIG. 5 is a graph illustrating single-mode-family optical parametric oscillation (s-OPO), in accordance with examples of the present disclosure.

Referring to FIG. 5 a graph of a single-mode-family OPO (sOPO) is shown. The pump operates at a near-to-zero but still normal dispersion (the top panel), and the effective modal indices have to be matched for idler, pump, and signal according to the equation ns/ns+ni/ni=2np/np (dashed line in the second panel) for modes with zero frequency mismatch (third panel) $\Delta v$=ns+ni−2np=0. Such sOPO can have three competitive processes, the process in the designed configuration but with adjacent signal and idler modes also exhibiting OPO (I), close-band OPO (II) or frequency comb generation, and cluster comb generation where many closely-spaced parametric sidebands surround the targeted signal and/or idler modes (III).

Referring to FIG. 6 a graph of the hOPO device 100 where two different mode families are used is shown. The pump mode is chosen from the higher-effective-index mode (H), which exhibits normal dispersion across the entire spectral range under consideration. The signal can be from the lower-effective-index mode (L). The matching of effective modal indices (i.e., phase-matching) in this case depends on the difference of H and L modal indices at the signal wavelength rather than the dispersion of a single mode family (H or L) as in sOPO (FIG. 5). Equivalently, the frequency matching line is shifted downward, due to the difference of effective indices of these two modes at the signal frequency, as shown in the third panel. This configuration is termed HHL, indicating a higher-index (H) or lower-index (L) mode family from which each of the signal mode, pump mode, and/or idler mode (in this order) is taken. Because the pump mode is in a more strongly normal dispersion region than in sOPO, most competitive processes will be excluded, and only process I is expected to potentially be present.

Figure 7:
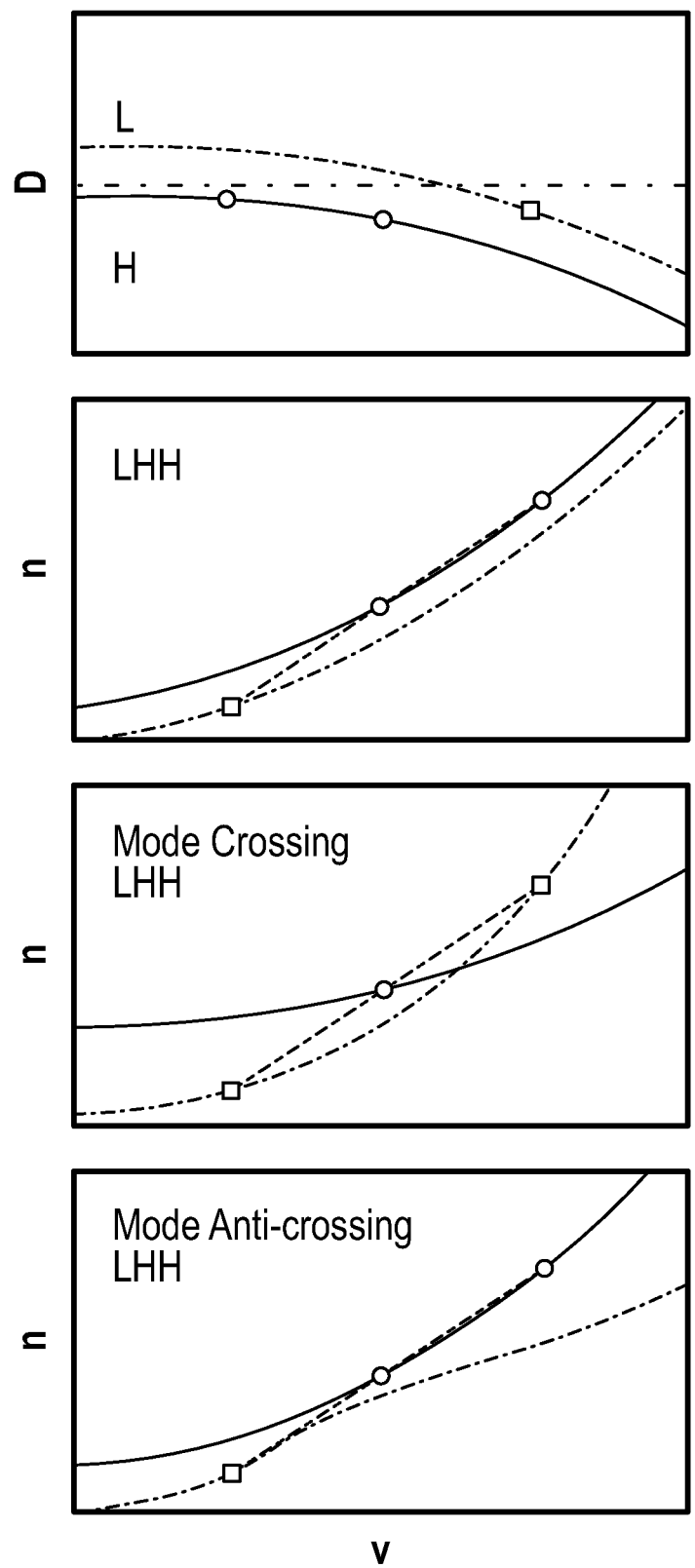
FIG. 7 is a graph illustrating other hybrid configurations for operating the h-OPO device, in accordance with examples of the present disclosure.

Referring to FIG. 7, a graph of other hOPO configurations is shown. The hOPO can operate in many other configurations. First, as shown in the top panel, the lower-index mode family (L) can have anomalous dispersion for idler and pump frequencies, with the higher-index mode being normal for all three frequencies; moreover, the dispersion of H and/or L can be shifted up and down. Second, besides the MIL scheme, LHH (or LHL) can also be used as shown in the second panel. Moreover, when two modes are adjacent to each other and similar in effective modal indices, these two modes can exhibit either a direct crossing (third panel) or an anticrossing (bottom panel).

From the perspective of hOPO, these two cases (direct crossing and anticrossing) are not particularly different as long as the participating modes (i.e., those whose effective modal indices enable phase-matching for frequency-matched modes) are situated away from the crossing/anti-crossing point. In the mode anticrossing case, an additional benefit is that the mode overlap is guaranteed because of mode hybridization. In other hOPO cases (without mode hybridization), adequate spatial mode overlap for modes from differing families is required, similar to other nonlinear mixing processes using different families, for example, $\chi^{(2)}$ OPO and second-/third-harmonic generation.

Referring to FIG. 8, a diagram illustrating the dominant electric field components of the TE1, TE2, TM1, and TE3 modes of the device 100 of FIG. 1 is shown. The dominant electric field components of the TE1, TE2, TM1, and TE3 modes are shown at about 390 THz (769 nm) in an exemplary device 100 with ring radius RR of about 28 μm, ring width RW of about 2.8 μm, and ring thickness H of about 323 nm are with the effective modal indices sorted from high to low.

Figure 9:
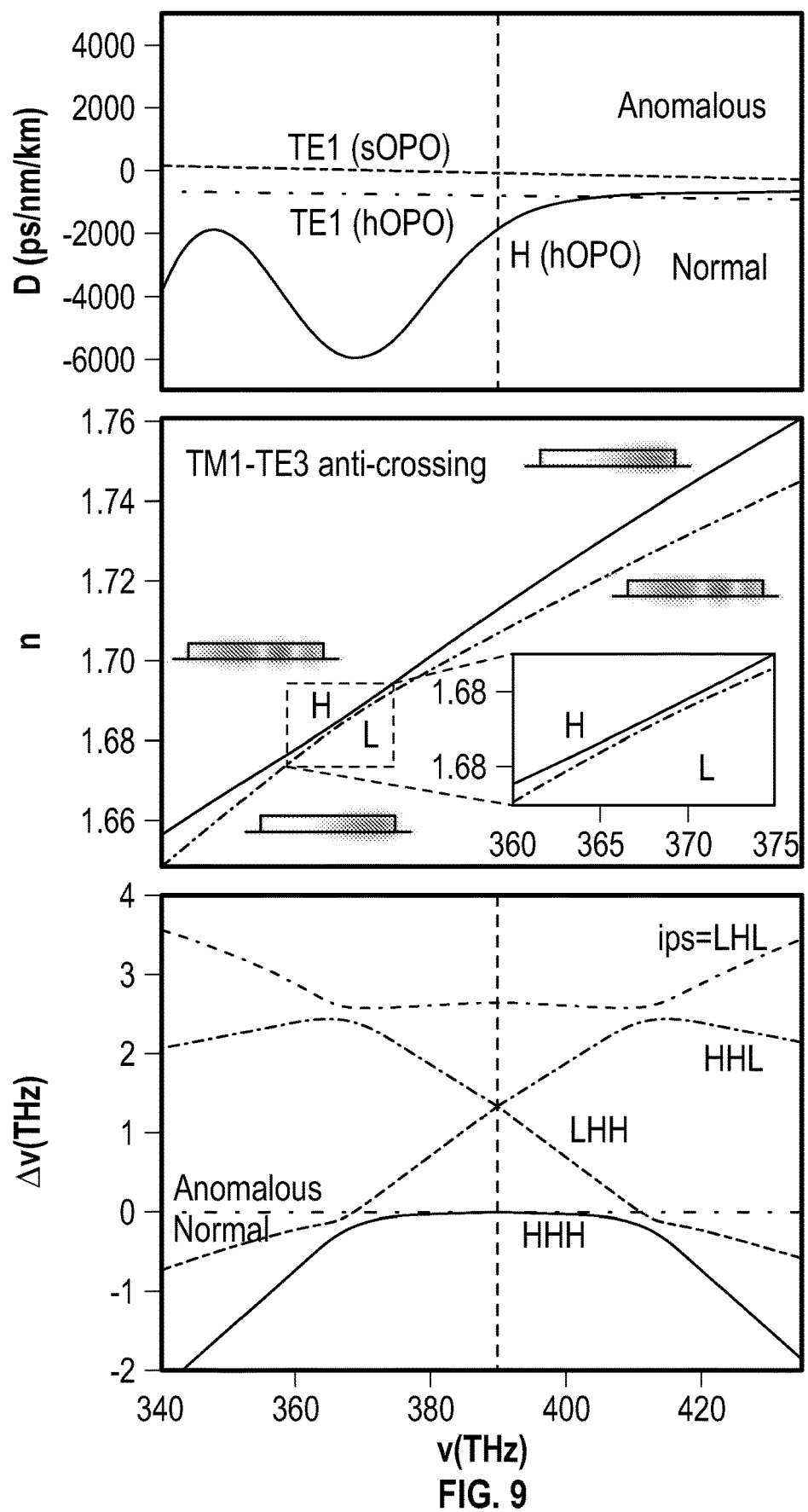
FIG. 9 is a graph that illustrates the dispersion, the effective modal index, and the frequency mismatch to support hOPO, in accordance with examples of the present disclosure.

Referring to FIG. 9, a diagram that illustrates the dispersion, the effective modal index, and the frequency mismatch to support hOPO is shown. The top panel shows the dispersion parameter for the higher branch (H curve), which hybridizes TM1 and TE3 modes in a microring with RW=about 2.8 μm and H=about 323 nm. The dispersion around 390 THz is about −1860 ps/(nm·km). In comparison, the dispersion for the TE1 mode (dashed line) in such a device is about −830 ps/(nm·km), and the dispersion around the pump mode in sOPO13 (dashed line, RW=about 825 nm) is very close to zero dispersion, i.e., greater than about −100 ps/(nm·km). The middle panel shows the effective modal indices of the higher and lower branches, which hybridize TM1 and TE3 modes. The curves exhibit an anti-crossing at about 368 THz, where the higher branch (H) shifts from TE3 to TM1, and the lower branch (L) shifts from TM1 to TE3, with frequency increased from about 340 THz to about 435 THz. The bottom panel shows the frequency mismatch ($\Delta v$) in all four possible configurations when the pump is at 390 THz and from the H branch. The four configurations are labeled based on the chosen families for the idler, pump, and signal modes, and are LHL, HHL, LHH, and HHH. Choosing the pump from the H branch ensures that it is in the normal dispersion regime, as shown in the curve for HHH. The only configuration that supports the frequency matching needed for OPO is LHH, with the idler frequency of about 370 THz and the signal frequency of about 410 THz.

Figure 10:
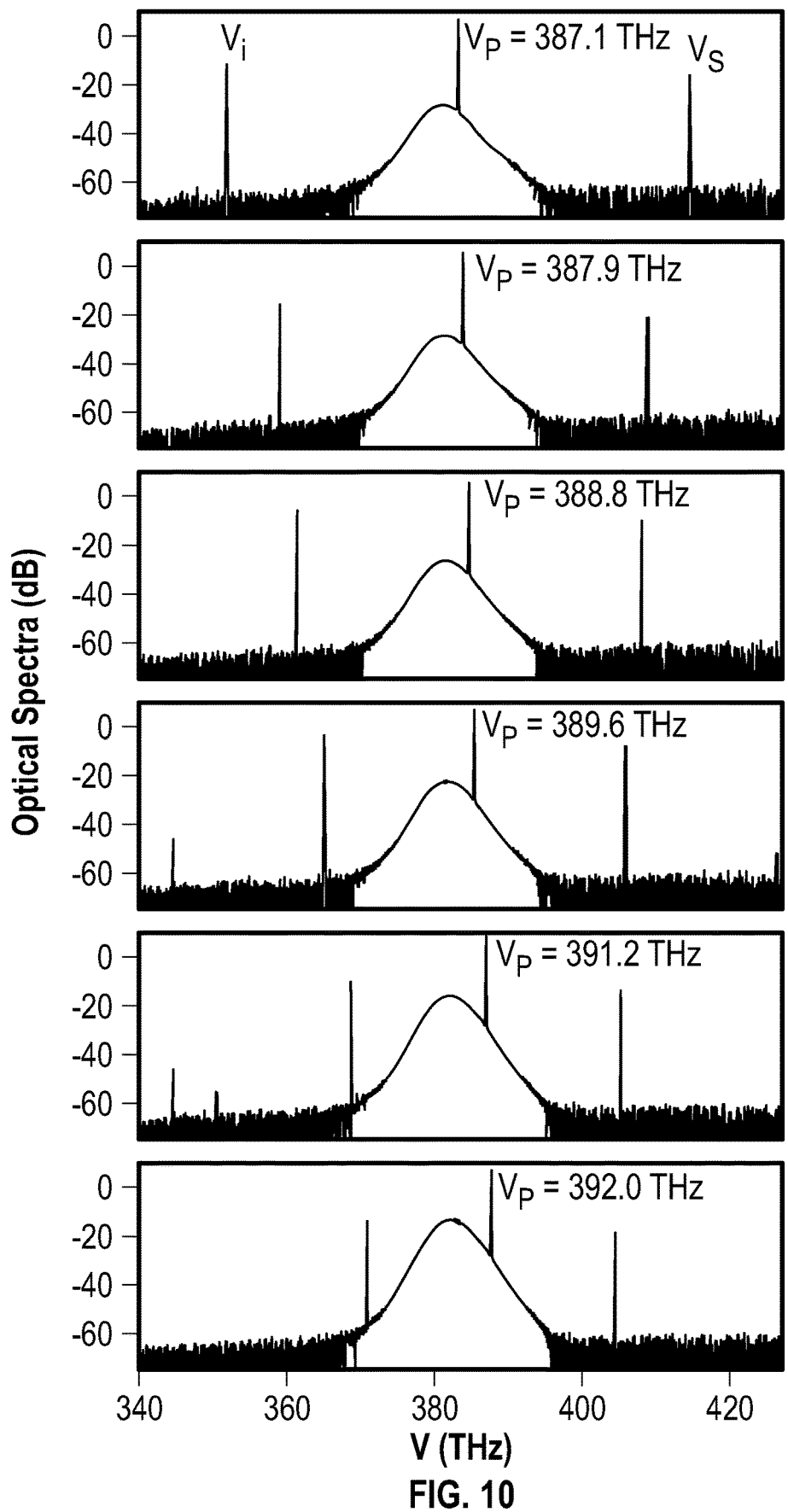
FIG. 10 is a graph that illustrates the optical spectra as the pump frequency of the device of FIG. 1 is tuned from 387 THz to 392 THz, in accordance with examples of the present disclosure.

FIG. 10 shows a graph that illustrates the optical spectra as the pump frequency (Vp) of the device of FIG. 1 is tuned from about 387 THz to about 392 THz. On the y axis, 0 dB is referenced to 1 mW, i.e., dBm.

Figure 11:
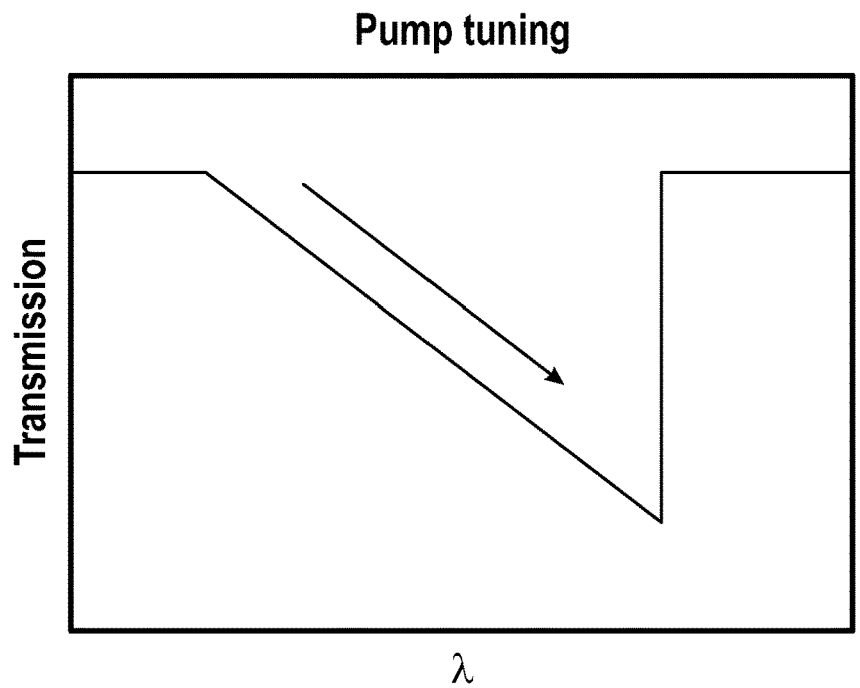
FIG. 11 is a graph that illustrates tuning the pump from shorter wavelength to longer wavelength, to follow the triangular shape of thermal bistability, in accordance with examples of the present disclosure.

FIG. 11 shows a graph that illustrates tuning the pump from shorter wavelength to longer wavelength, to follow the triangular shape of thermal bistability. The physics of hOPO suggests that hOPO should be very robust to device dispersion. As described earlier, the underlying reason is that phase-matching is realized by considering the difference in effective modal index between two mode families at one frequency (signal or idler) instead of through fine balancing of higher-order dispersion in one mode family. A consequence of this is that a change to device dimensions over a wide range should only lead to a small change of signal and idler frequencies, as long as the pump mode device is still in the normal dispersion regime. In aspects, the hOPO output tunes as a function of ring width (RW) variation, pump detuning, and temperature tuning, as illustrated in FIGS. 1, 2, and 11.

Figure 12:
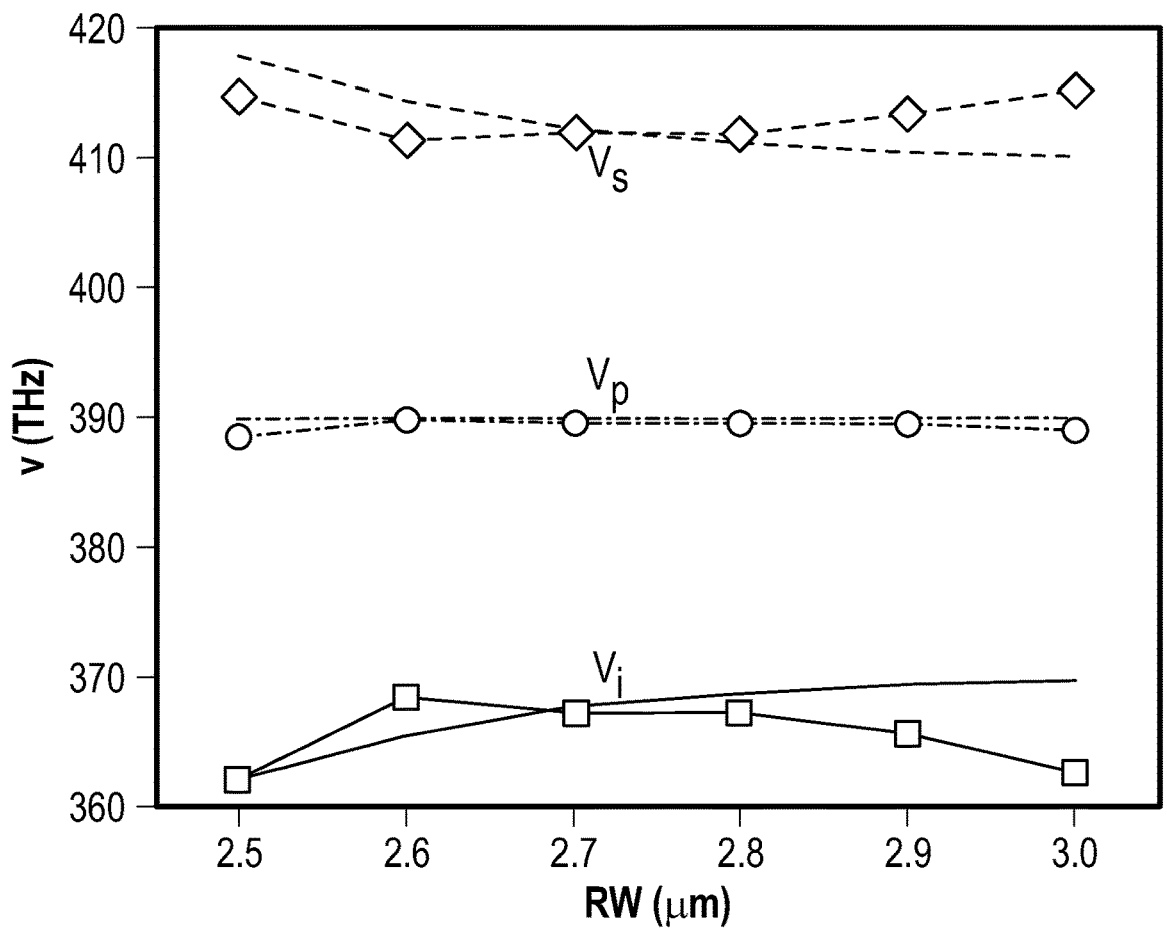
FIG. 12 is a graph that illustrates the ring width (RW) of the device of FIG. 1 being changed from 2.5 µm to 3.0 µm, in accordance with examples of the present disclosure.
Figure 13:
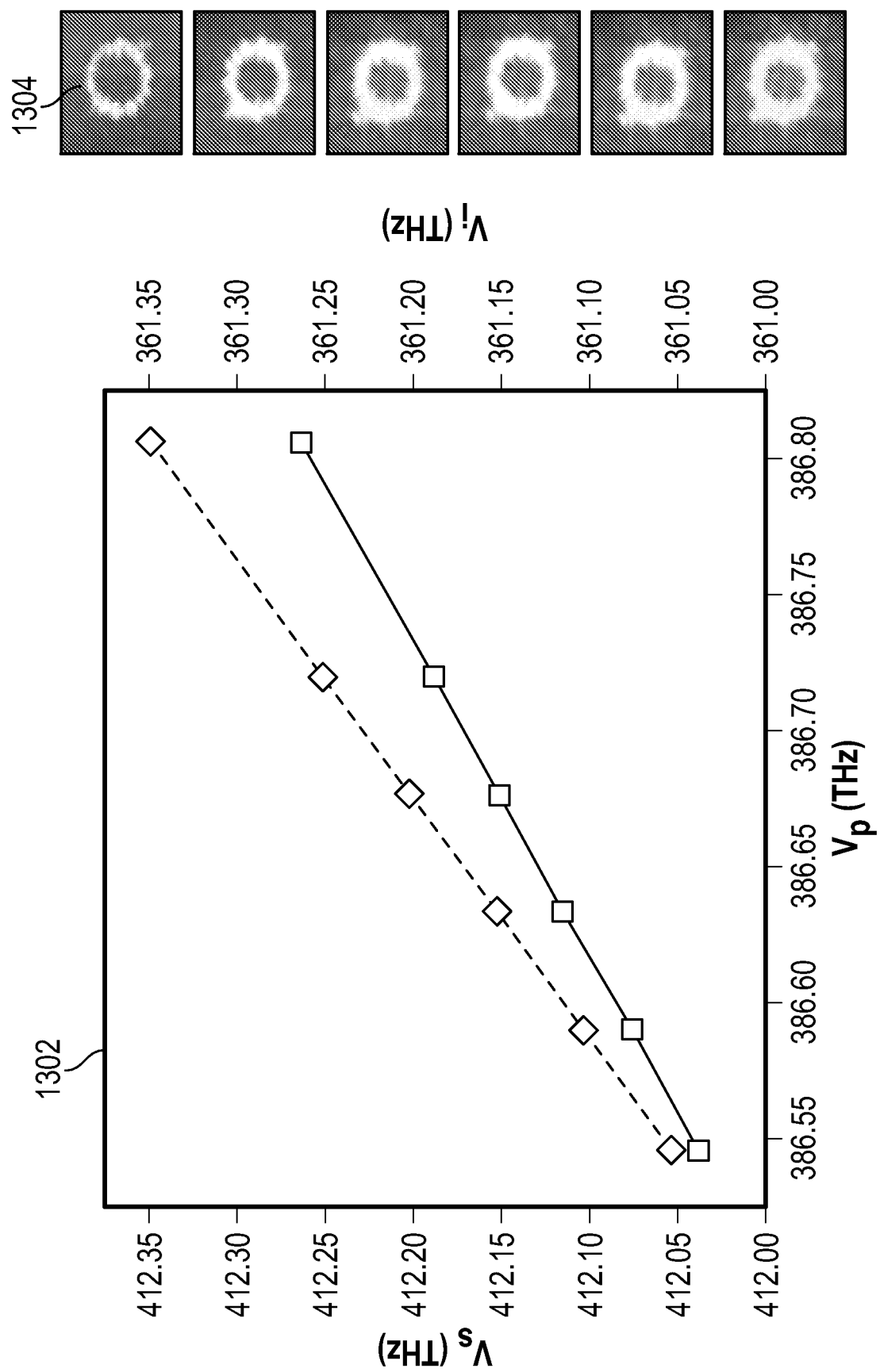
FIG. 13 is a graph that illustrates pump light frequency (Vp) vs signal light frequency (Vs) when the pump light frequency is varied, also shown are microscope images showing the signal light scattered by the surface roughness of the microring of the device of FIG. 1, in accordance with examples of the present disclosure.
Figure 14:
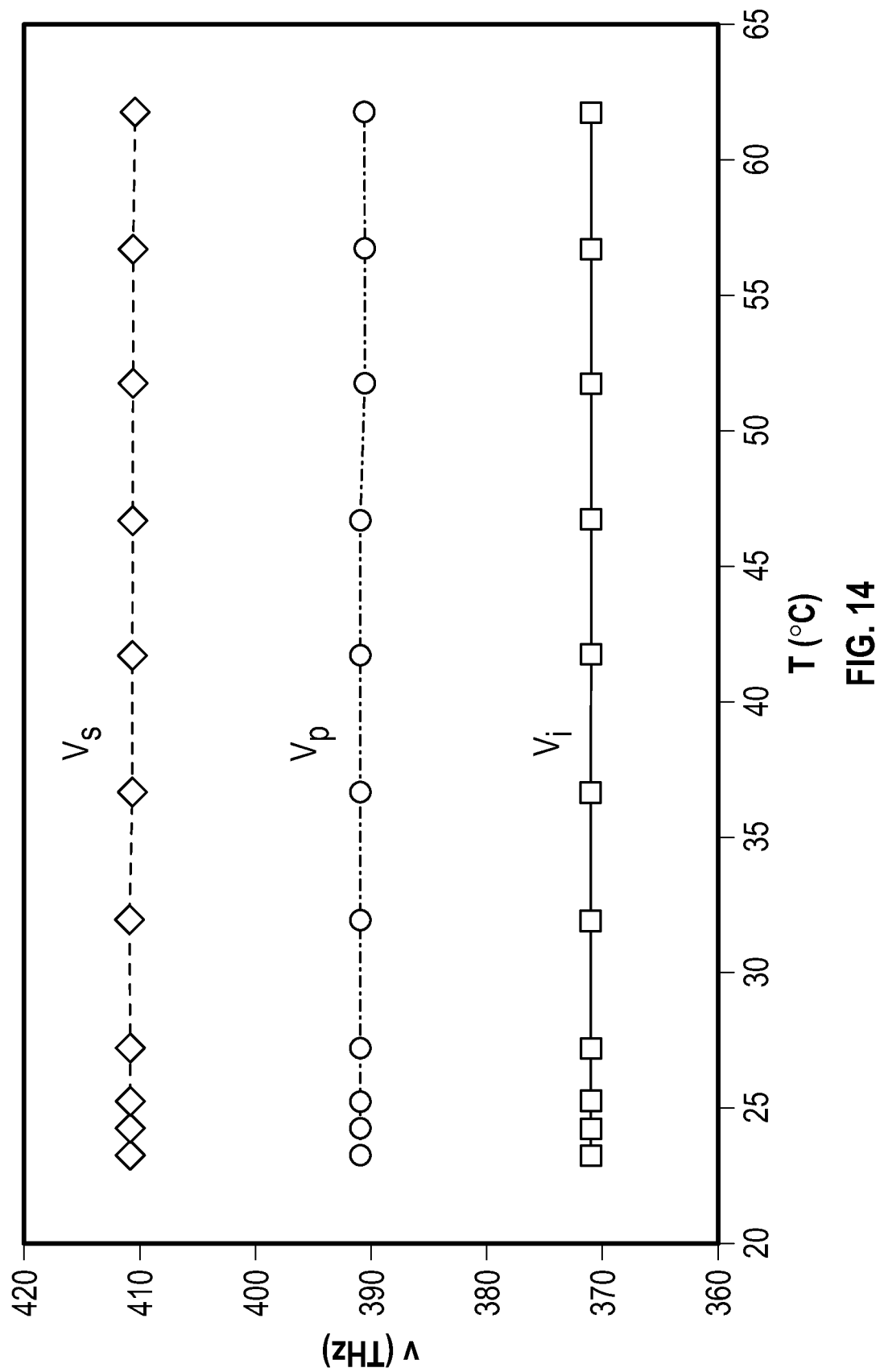
FIG. 14 is a graph that illustrates Vs, Vp, and Vi as the temperature is varied, in accordance with examples of the present disclosure.

FIG. 12 is a graph that illustrates the ring width (RW) of the device of FIG. 1 being changed from about 2.5 µm to about 3.0 µm. In FIG. 12 hOPO is very robust with respect to RW, with the output spectrum remaining consistent with the signal and idler frequencies remaining in the same frequency bands when varying RW from about 2.5 µm to about 3.0 The signal, pump, and idler frequencies are plotted in diamonds, circles, and squares in FIG. 12, and the simulated results are plotted as solid lines. The experimental results and the theoretical predictions agree well, with a slight deviation of about 5 THz on the RW=about 3 µm side, which is likely due to imprecise knowledge of the fabricated geometry due to nanofabrication uncertainty. FIG. 13 is a graph that illustrates pump light frequency (Vp) vs. signal light frequency (Vs) when the pump light frequency is varied. In the device with RW of about 2.6 when the pump laser is coupled into the cavity with its frequency varying from about 386.8 THz (right) to about 386.5 THz (left), the signal light and the idler light are tuned to about 0.3 THz and about 0.2 THz, respectively, in a continuous fashion. The microscope images on the right show the signal light scattered by the microring surface roughness, where the scattered light is brighter (from top to bottom), as the pump laser is coupled deeper into the cavity. The pump light and idler light are filtered out by a short-pass filter. FIG. 14 illustrates Vs, Vp, and Vi as the temperature is varied. The hOPO output is found to be stable across this temperature range of about 40° C.

Figure 15:
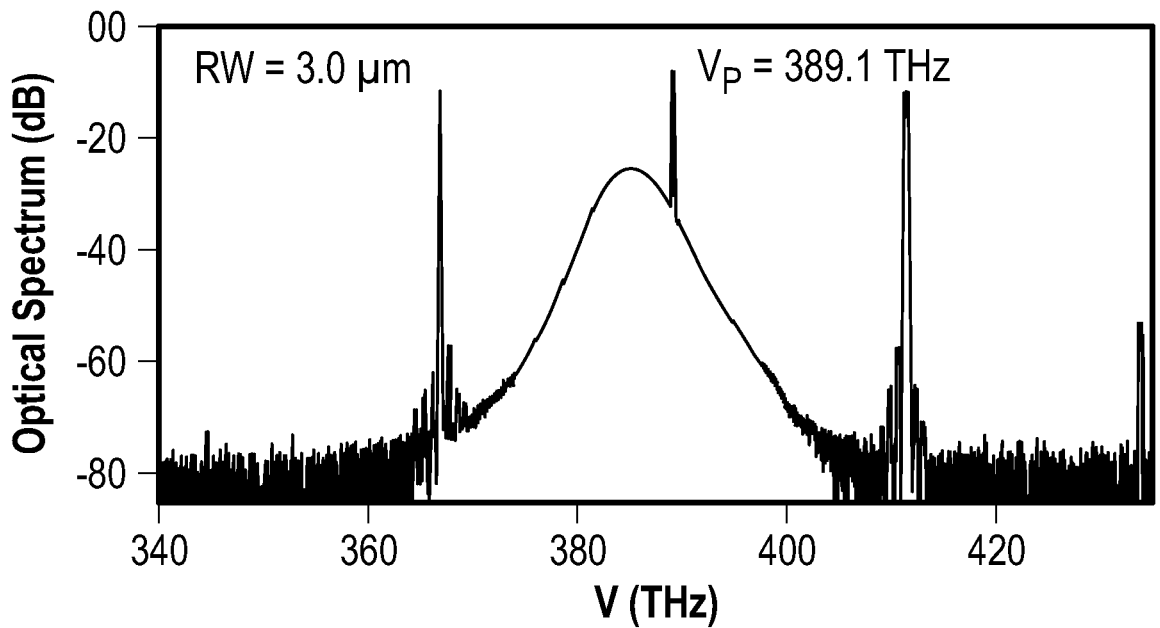
FIG. 15 is a graph illustrating the optical spectra of the device of FIG. 1, in accordance with examples of the present disclosure.

FIG. 15 is a graph illustrating the optical spectra of the device of FIG. 1. A relatively flat output optical spectrum from a hOPO device 100 pumped at about 389.1 THz in the RW of about 3 µm device. Signal and idler outputs are within about −3.5 dB of the pump output. On the y-axis, 0 dB is referenced to 1 mW, i.e., dBm. A power dependence study with the pump frequency fixed.

The robustness of hOPO also indicates that it should be capable of reaching higher power output for signal and idler, particularly considering its dispersion naturally restricts competitive nonlinear processes. To date, the sOPO typically show about −10 dB to about −20 dB lower output power at the signal and idler than at the pump. When signal and idler are very widely separated, the signal output power level is typically further decreased, likely because of coupling (as the high-frequency signal tends to be undercoupled in microring-waveguide geometries if the pump is critically-coupled). Besides coupling, the low output power is mainly due to competitive processes, which limit the OPO conversion efficiency when the power is significantly above the threshold. Therefore, hOPO behaves better than sOPO because hOPO has much fewer competitive processes than sOPO.

An example of such performance for a RW of about 3 µm device pumped at about 389.1 THz. This hOPO can exhibit a very flat output spectrum, as shown in FIG. 15, where signal and idler outputs are both within about −3.5 dB of the pump output. Next, the pump power may be changed while fixing the pump frequency and calculate the conversion efficiencies (for signal and idler) and output powers (for pump, idler, signal) in the waveguides.

Figure 16:
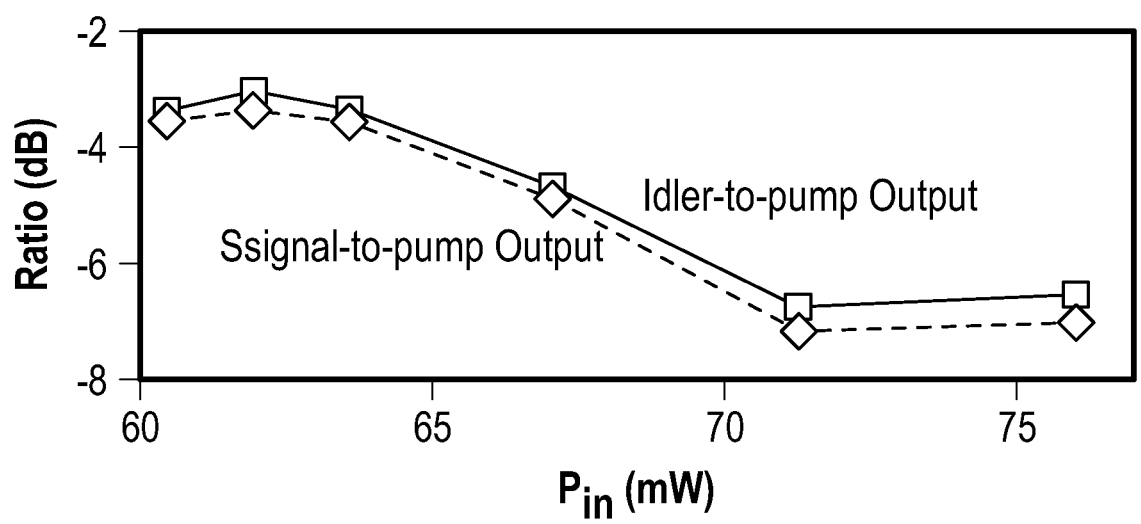
FIG. 16 is a graph illustrating the signal to pump output ratio and idler to pump output ratio of the device of FIG. 1, in accordance with examples of the present disclosure.

FIG. 16 is a graph illustrating the signal-to-pump output ratio and idler-to-pump output ratio of the device of FIG. 1. The ratio in FIG. 16 is collected from the optical spectra of FIG. 15. Examining first the output spectra, the idler and signal are up to about −3.0 dB and about −3.4 dB away from the pump, respectively, in FIG. 16.

Figure 17:
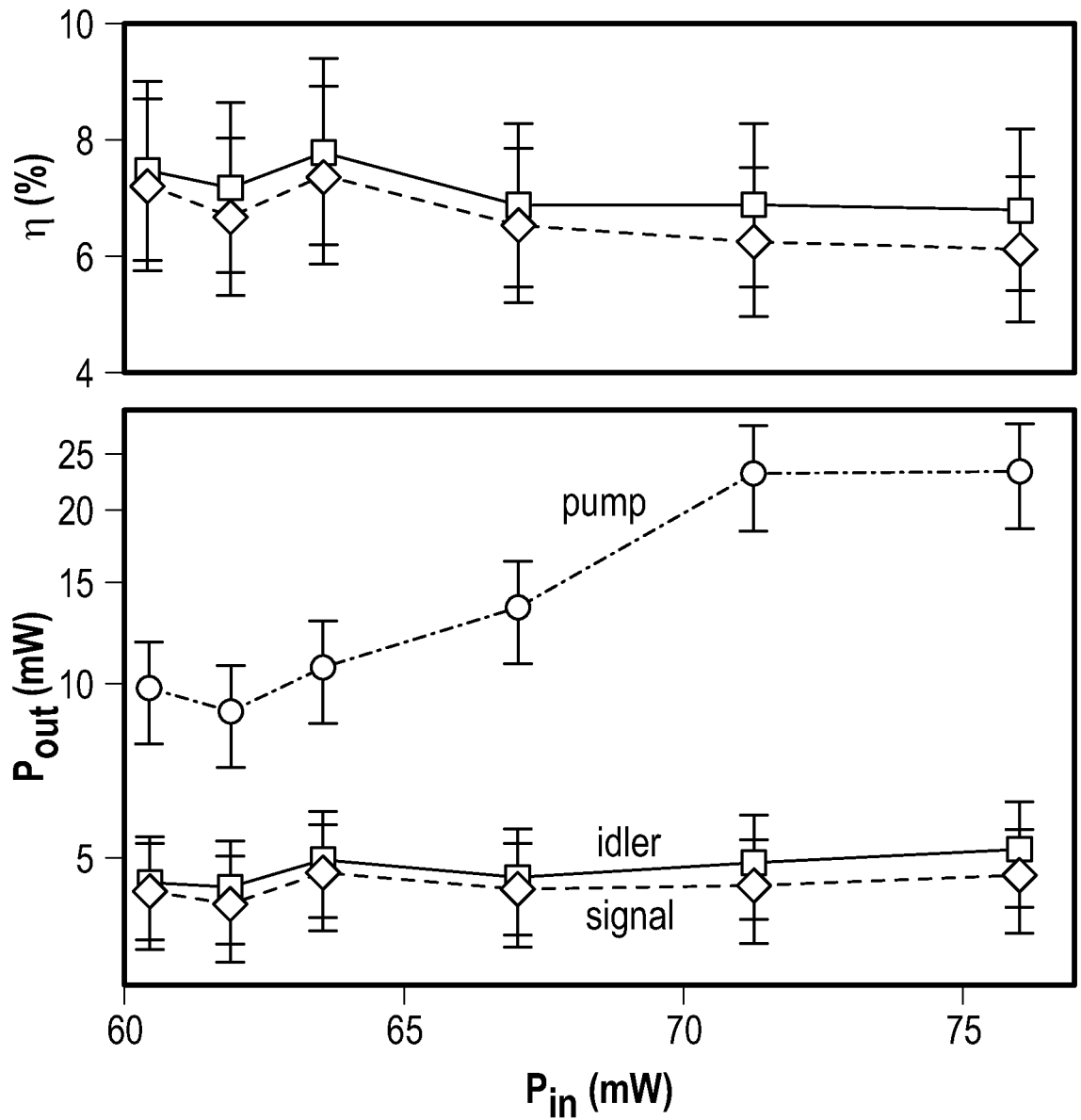
FIG. 17 is a graph illustrating the signal to pump output and idler to pump output efficiencies and the pump output power, signal output power, and idler output power for the device of FIG. 1, in accordance with examples of the present disclosure.

FIG. 17 is a graph illustrating the signal to pump output and idler to pump output efficiencies and the pump output power, signal output power, and idler output power for the device of FIG. 1. Next, the on-chip conversion efficiency is up to about 8±2% and about 7±2% for idler and signal, respectively, in the top panel of FIG. 17. The output power is up to about 5±1 mW and about 4.6±0.9 mW for idler and signal, respectively, in the bottom panel of FIG. 17. The metrics of flatness of the output spectrum, conversion efficiency, and output power are likely optimized at slightly different regions of parameter space.

Figure 18:
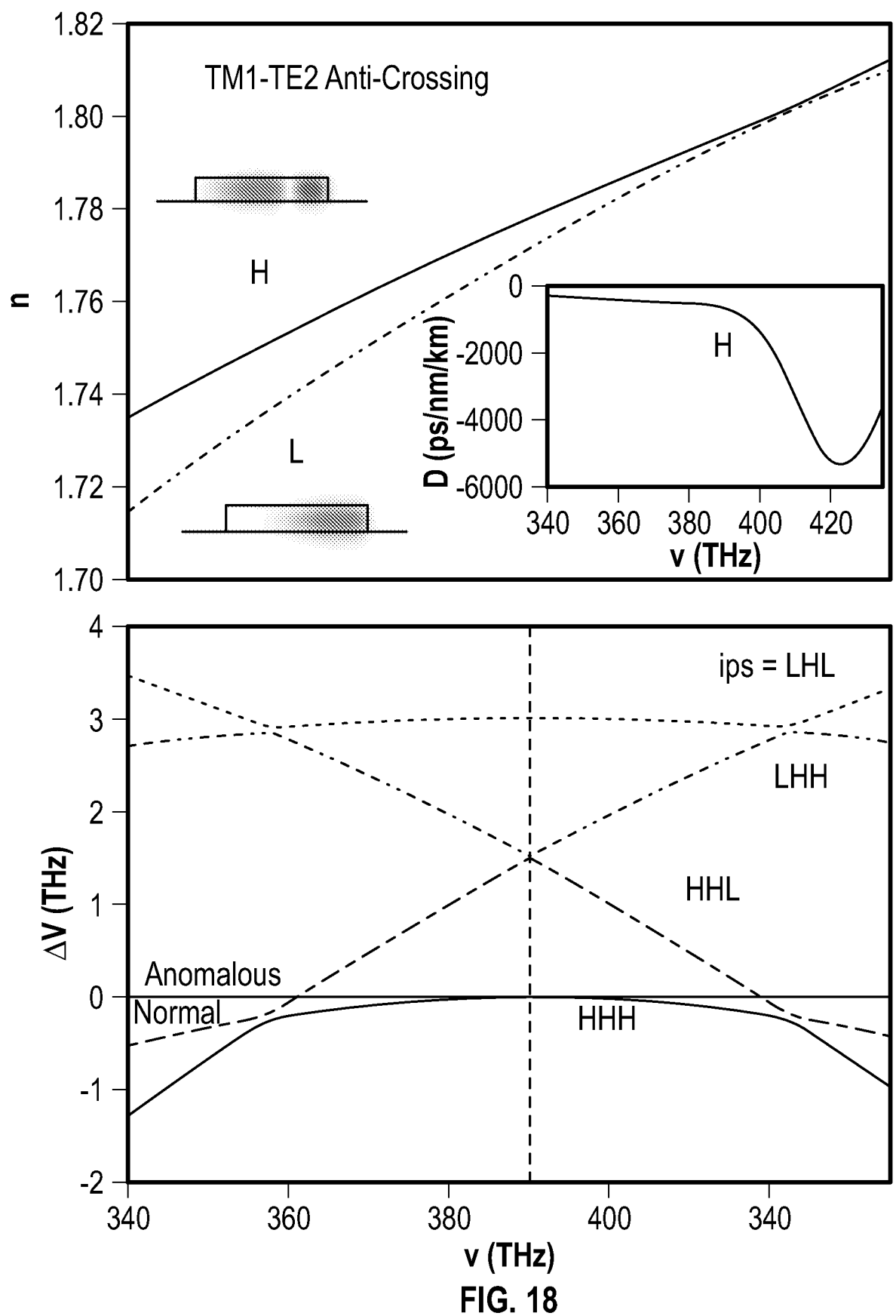
FIG. 18 is a graph illustrating another example of an hOPO device with a TM1-TE2 anticrossing, in accordance with examples of the present disclosure.
Figure 19:
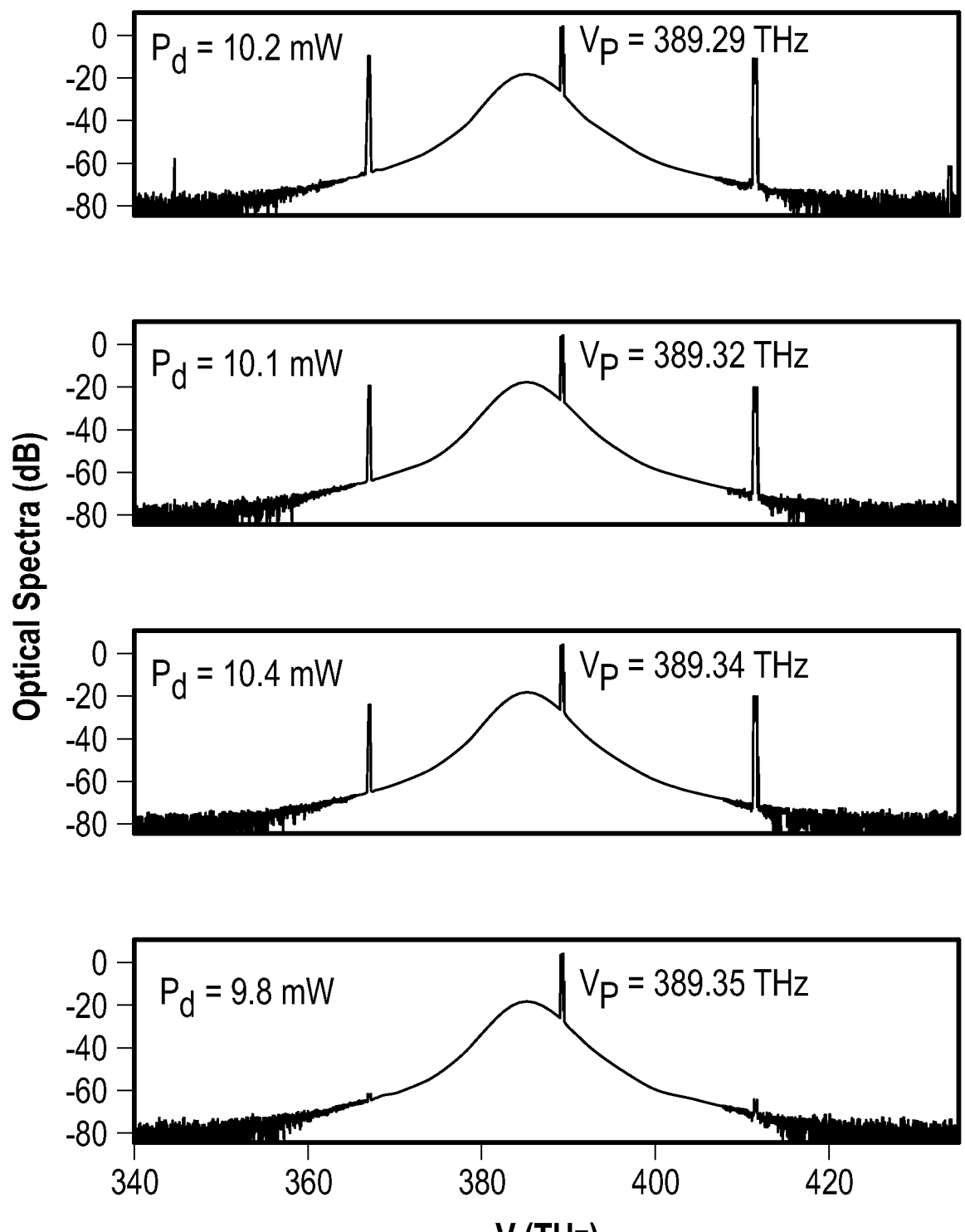
FIG. 19 is a graph illustrating the optical spectra of the hOPO device of FIG. 18, in accordance with examples of the present disclosure.

FIG. 18 shows a graph illustrating another example of an hOPO device with a TM1-TE2 anti-crossing. In this case, the hOPO device 100 has a thickness of H=about 385 nm and a ring width of RW=about 2.3 µm. As shown in the top panel of FIG. 18, the simulation suggests that TE2 and TM1 modes have an anti-crossing around 420 THz, below which TE2 is the higher-index (H) branch and TM1 is the lower-index (L) branch. The H branch exhibits large normal dispersion across the spectral range of interest, as shown in the inset. As shown in the bottom panel, the frequency mismatch (Δv) calculated from the simulation confirms that the H branch has a normal dispersion as the HRH curve (blue) is below zero. Out of the four cases with the H mode as the pump, the only case supporting OPO is HHL (red). Such hOPO exists for three consecutive pump modes from about 386 THz to about 388 THz, as shown in FIG. 19. In the 386 THz case (the top panel), the signal is around the mode anti-crossing of 420 THz; in the other two cases, the signals are at frequencies below the anti-crossing point. Because the signal is in the L branch in the MIL configuration, the signal should be about equally split into TM1 and TE2 in the top panel, and be more dominantly composed of TM1 rather than TE2 in the two other two panels. In other words, the mode anti-crossing does not seem necessary for hOPO to exist.

Figure 20:
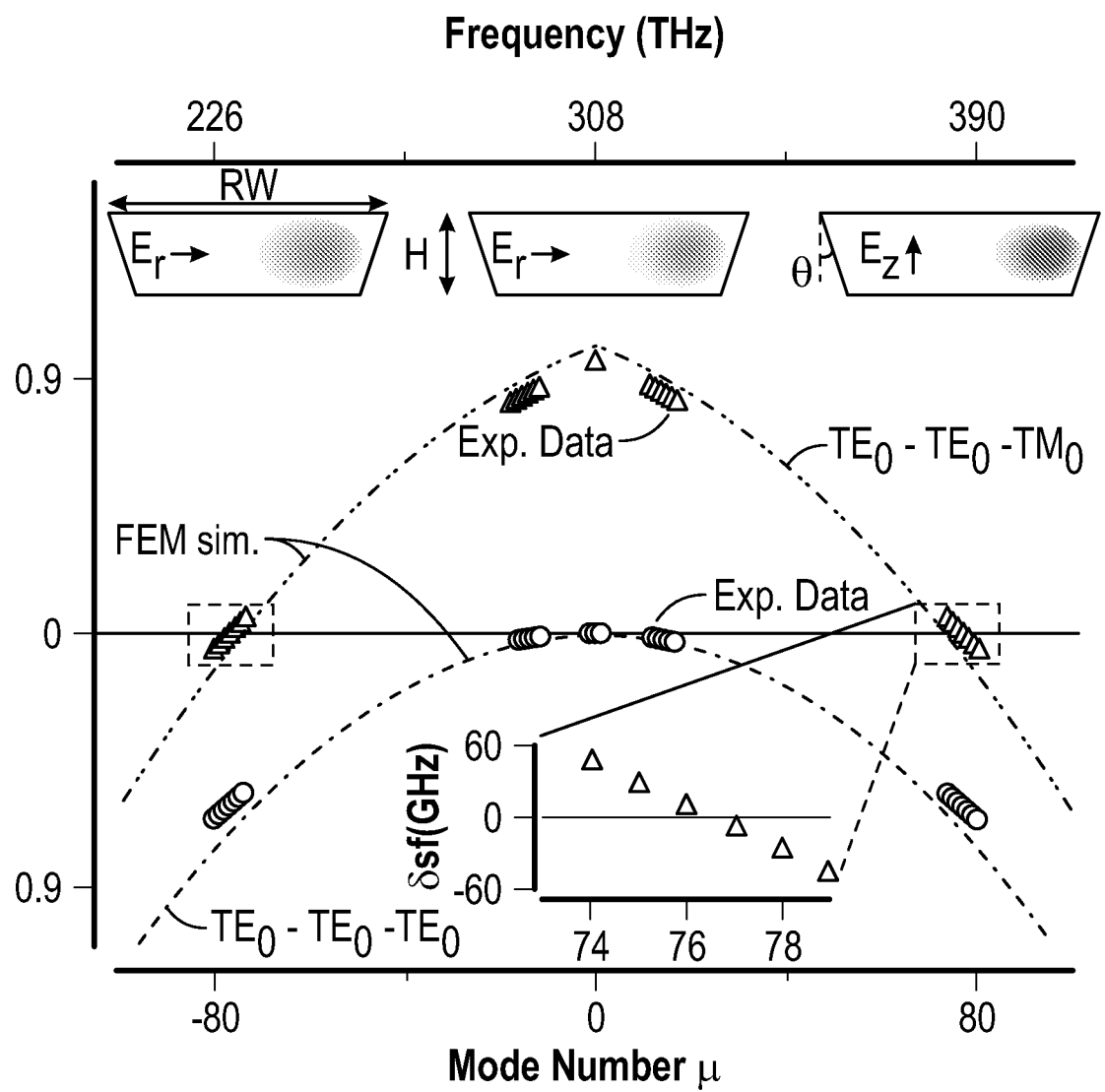
FIG. 20 is a graph illustrating the mode number vs frequency for the hOPO device of FIG. 1, in accordance with examples of the present disclosure.

In aspects, the device 100 may be fabricated through a photonic damascene process. The device 100 may include a microring resonator 130 with a layer 132 (FIG. 1) that may have a height (H) of about 890 nm thick that is fully silicon dioxide ($SiO_2$)-clad silicon nitride ($Si_3N_4$) with outer radius of about 23 µm and a ring width (RW) of about 3 µm. FIG. 20 shows a typical cross-section of a microring, which has an inverted trapezoidal shape, with a sidewall angle of about 16 degrees as a result of the reflow step within the damascene process.

The frequency mismatch Δv for phase-matched sets of the signal mode, the idler mode, and the pump mode may be measured as shown in FIG. 20. Δv is plotted as a function of the relative mode number µ, indexed with respect to a pump band mode at about 308 THz. Two cases may be considered, the targeted process in which the idler and pump are from the fundamental transverse electric ($TE_0$) mode family, and the signal is from the fundamental transverse magnetic mode ($TM_0$) family, and one in which all three modes are from the $TE_0$ mode family, i.e., the more typical single mode family case. In the $TE_0$-$TE_0$-$TM_0$ hOPO scheme, Δv of about 0 at frequencies near about 390 THz and about 226 THz, indicating that the OPO signal and idler pair may be anticipated near these frequencies for an appropriate level of pump laser detuning and Kerr nonlinear shifts to compensate for any non-zero frequency mismatch. In contrast, Δv<0 at all frequencies for the $TE_0$-$TE_0$-$TE_0$ case, indicating that the widely separated process of interest will not occur for this set of modes. These results confirm that the pump is situated in a regime of normal dispersion, which is explicitly validated through the evaluation of the dispersion parameter D for the TE$_0$ and TM$_0$ mode families, where $$D = -\frac{c}{2\pi\lambda^2}\frac{\partial^2\beta}{\partial v^2}, \; D < 0$$

for the TE$_0$ family, not only in the pump band but also in the idler band (as well as the signal band). In addition, D<0 for the TM$_0$ family in the signal band. As discussed above, this normal dispersion throughout the entire frequency range between the signal and idler, and in particular surrounding the pump, should suppress many potentially competing nonlinear processes.

The resonator-waveguide coupling is critical for a high-performance OPO. Conversion efficiency and output power of the idler generated near about 1300 nm. $\eta^{max}_i$ depends on the coupling parameter for the pump K$_p$ and for the idler K$_i$, with greater efficiency being achieved with increased K$_i$ and K$_p$. Additionally, to maintain an acceptable threshold power and because the extraction of the signal is not focused on, small K$_s$ may be targeted. Using a straight waveguide that is at a gap and tangent to the ring naturally leads to variation in resonator-waveguide coupling across broad spectral ranges, since the modal overlap between ring and waveguide modes depends on the evanescent decay lengths of each mode, which itself depends on wavelength. As a result, long wavelength modes tend to be overcoupled and short wavelength modes tend to be undercoupled, so that K$_i$>K$_p$>K$_s$ as desired, provided that intrinsic quality factors remain high throughout.

Figure 21:
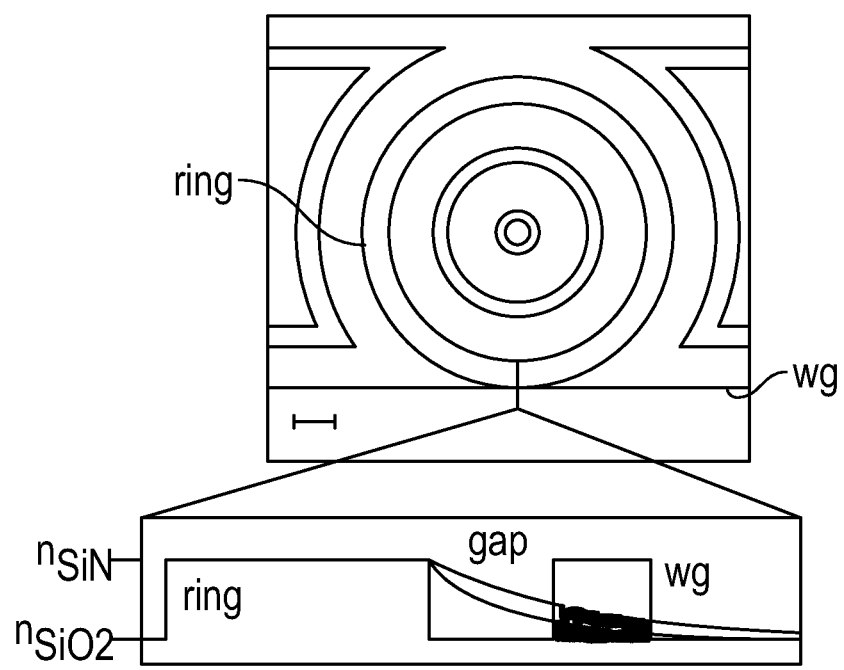
FIG. 21 is, an image of an example layout and side cutaway of the device 100 of FIG. 1 is shown, in accordance with examples of the present disclosure.

Referring to FIG. 21, an example layout and side cutaway of the device 100 of FIG. 1 is shown.

Figure 22:
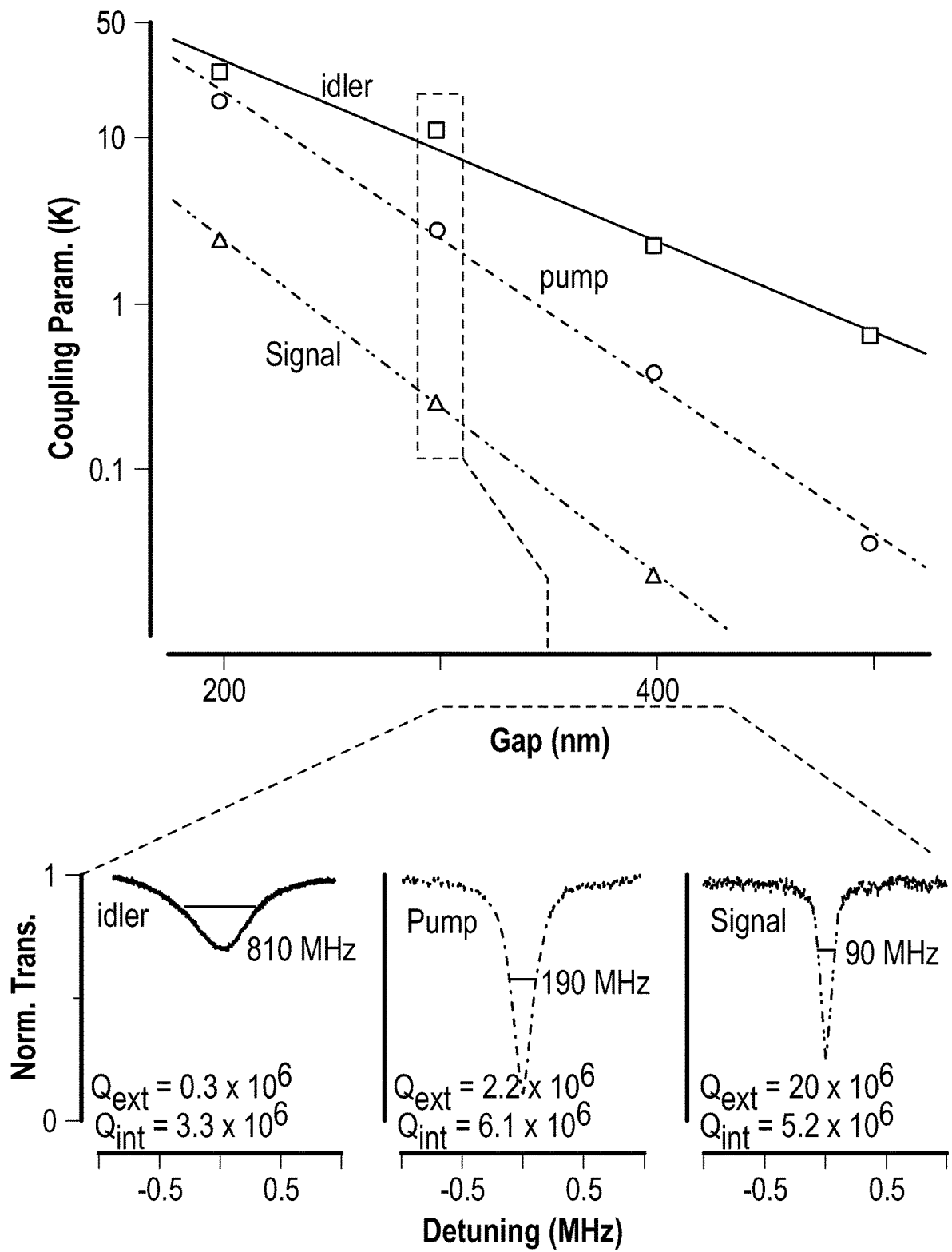
FIG. 22 is a graph illustrating the coupling parameters $K_i$, $K_p$, and $K_s$ for a series of devices, in accordance with examples of the present disclosure.

Referring to FIG. 22, coupling parameters K$_i$, K$_p$, and K$_s$ is shown for a series of devices 100 in which the resonator-waveguide gap is varied between about 200 nm and about 500 nm. An increase in K$_{i,p,s}$ with decreasing gap is shown in FIG. 22, where K$_i$>K$_p$>K$_s$. Specific gap values may be chosen to target the high-performance overcoupled regime. For example, FIG. 20 shows the cavity mode transmission spectra at a gap of 300 nm. Of note are the high intrinsic quality factors achieved, e.g., Q$_{int}$ about {5.2×10$^6$, 6.1×10$^6$, 3.5×10$^6$} for the signal, pump, and idler bands, respectively. This enables significant overcoupling to be achieved (K$_i$≳10, K$_p$≳1) while maintaining high overall Q s. In comparison to other works utilizing resonators of a similar cross-section and size (i.e., an FSR of 1 THz), the intrinsic Qs observed are somewhat higher. This is likely a consequence of the relatively wide approximately 3 µm ring widths that are used, which limits the interaction of the optical field with the sidewalls. The ability to use such wide rings is a benefit of the hOPO scheme.

The disclosed technology has the benefit of enabling a high-performance on-chip microresonator optical parametric oscillation that produces>about 15 mW of output power at conversion efficiencies of >about 25%, without compromising on the span of the output signal and idler frequencies (>about 150 THz signal-idler separation). Simultaneously realizing these three features in an on-chip OPO represents a significant advance in the realization of flexible wavelength access for lasers. Furthermore, its development on a platform compatible with silicon photonics makes the device 100 well suited for wide-scale deployment outside of laboratory settings. The disclosed technology may use combined coupling engineering and flexible frequency matching techniques, such as the hybrid mode-matching scheme used in this work (or recently implemented photonic crystal microring approaches), to enable high-performance OPO across different wavelength bands, including the visible and mid-infrared.

Certain embodiments of the present disclosure may include some, all, or none of the above advantages and/or one or more other advantages readily apparent to those skilled in the art from the drawings, descriptions, and claims included herein. Moreover, while specific advantages have been enumerated above, the various embodiments of the present disclosure may include all, some, or none of the enumerated advantages and/or other advantages not specifically enumerated above.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different example embodiments provided in the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A system for generating a coherent laser light, comprising:
   a light source configured to pump a first color laser light; and
   a device configured to generate a coherent second color light and a coherent third color light, the device including:
   a waveguide configured to couple to the light source; and
   a microring resonator coupled to the light source via the waveguide, the microring resonator configured to generate a coherent second color light and a coherent third color light,
   wherein the generation of the coherent second color light and the coherent third color light is based on hybrid-mode optical parametric oscillation.

2. The system of claim 1, wherein the microring resonator includes:
- a layer comprised of silicon nitride, the layer including a ring width, the layer including a first side and a second side;
- a substrate comprised of silicon dioxide disposed on the second side of the layer; and
- a cladding comprised of air located on the first side of the layer.

3. The system of claim 2, wherein the substrate includes a first side and a second side, and
wherein the microring resonator further includes a silicon layer disposed on the second side of the substrate.

4. The system of claim 2, wherein the substrate includes a first side and a second side, and
wherein the device further includes a heater disposed on the second side of the substrate.

5. The system of claim 1, wherein the microring resonator includes a plurality of modes selected from different families of modes.

6. The system of claim 1, wherein the microring resonator and the waveguide are on a common substrate.

7. The system of claim 6, wherein the waveguide outputs a signal wave including a signal mode and an idler wave including an idler mode, and
wherein the first color laser light includes a pump mode.

8. The system of claim 7, wherein the microring resonator includes a ring radius, wherein the ring radius is based on phase matching,
wherein the light source includes the pump mode, and
wherein phase-matching is achieved by using a higher-effective-index for an idler mode, a higher-effective-index for the pump mode, and a higher-effective-index for the signal mode.

9. The system of claim 7, wherein a ring radius is based on phase matching,
wherein the light source includes the pump mode,
wherein the pump mode is chosen from a higher-effective-index mode,
wherein the signal mode is selected from a lower-effective-index mode, and
wherein the phase matching of effective modal indices is based on a difference of the higher-effective-index and the lower-effective-index at a wavelength of the signal wave.

10. The system of claim 1, wherein the device is configured such that azimuthal modes of the microring resonator are phase and frequency matched to different transverse spatial mode families of the microring resonator.

11. The system of claim 1, further comprising a heater configured for thermal management of the microring resonator.

* * * * *